(12) United States Patent
Asakura et al.

(10) Patent No.: US 11,959,930 B2
(45) Date of Patent: Apr. 16, 2024

(54) AUTOMATIC ANALYSIS APPARATUS

(71) Applicant: JEOL Ltd., Tokyo (JP)

(72) Inventors: Makoto Asakura, Tokyo (JP); Mine Yamashita, Tokyo (JP); Chikashi Nakai, Tokyo (JP); Kazushiro Nunokawa, Tokyo (JP)

(73) Assignee: JEOL Ltd., Tokyo (JP)

( * ) Notice: Subject to any disclaimer, the term of this patent is extended or adjusted under 35 U.S.C. 154(b) by 390 days.

(21) Appl. No.: 16/749,172

(22) Filed: Jan. 22, 2020

(65) Prior Publication Data

US 2020/0241025 A1 Jul. 30, 2020

(30) Foreign Application Priority Data

Jan. 24, 2019 (JP) .................................. 2019-010417

(51) Int. Cl.
*G01N 35/02* (2006.01)
*G01N 35/10* (2006.01)
*G01N 35/04* (2006.01)

(52) U.S. Cl.
CPC ....... *G01N 35/025* (2013.01); *G01N 35/1002* (2013.01); *G01N 35/1016* (2013.01);
(Continued)

(58) Field of Classification Search
CPC ............. G01N 35/025; G01N 35/1002; G01N 35/1016; G01N 35/1065;
(Continued)

(56) References Cited

U.S. PATENT DOCUMENTS

| | | | | |
|---|---|---|---|---|
| 4,586,546 A | * | 5/1986 | Mezei ................ | G01N 35/1011 141/2 |
| 2003/0070498 A1 | * | 4/2003 | Ohyama ............ | G01N 35/1083 73/864.02 |

(Continued)

FOREIGN PATENT DOCUMENTS

| | | | |
|---|---|---|---|
| JP | S58174852 A | | 10/1983 |
| JP | 5259550 B2 | * | 8/2013 |

(Continued)

OTHER PUBLICATIONS

Extended European Search Report issued in EP20150230.9 dated Jun. 24, 2020.

(Continued)

*Primary Examiner* — Benjamin R Whatley
*Assistant Examiner* — Curtis A Thompson
(74) *Attorney, Agent, or Firm* — The Webb Law Firm

(57) ABSTRACT

A measurement portion includes a containment unit including a plurality of containers containing a liquid, a dispensing unit including a dispensing probe for dispensing the liquid, and a gauging portion for gauging the liquid dispensed by the dispensing unit. An excessive immersion determination portion determines whether an immersion of the dispensing probe is excessive immersion that exceeds a predetermined range. An input portion can select and set an operation of the measurement portion to be performed after the excessive immersion determination portion determines that the immersion is excessive immersion from a plurality of modes. A measurement control portion controls the measurement portion depending on a mode set by the input portion.

3 Claims, 23 Drawing Sheets

(52) U.S. Cl.
CPC . *G01N 35/1065* (2013.01); *G01N 2035/0441* (2013.01); *G01N 2035/0443* (2013.01); *G01N 2035/0453* (2013.01); *G01N 2035/0475* (2013.01); *G01N 2035/1032* (2013.01)

(58) Field of Classification Search
CPC ... G01N 2035/0441; G01N 2035/0443; G01N 2035/0453; G01N 2035/0475; G01N 2035/1032; G01N 35/1009; G01N 2035/1025; G01N 35/1011; G01N 35/1004; G01N 2035/00277; G01N 35/00623

See application file for complete search history.

(56) References Cited

U.S. PATENT DOCUMENTS

| | | | | |
|---|---|---|---|---|
| 2009/0169432 A1* | 7/2009 | Kuroda | ............. | G01N 35/1009 422/400 |
| 2010/0051060 A1* | 3/2010 | Kuroda | ................... | B01L 13/02 134/166 C |
| 2010/0210007 A1* | 8/2010 | Iwamura | ............ | G01N 35/1011 435/286.2 |
| 2011/0174343 A1* | 7/2011 | Azuma | .............. | G01N 35/1004 134/113 |
| 2012/0003731 A1* | 1/2012 | Kuroda | ............ | G01N 35/00732 134/18 |

FOREIGN PATENT DOCUMENTS

| | | |
|---|---|---|
| JP | 5259550 B2 | 8/2013 |
| JP | 2014194351 A | 10/2014 |

OTHER PUBLICATIONS

European Patent Office Examination Report issued in EP20150230.9, dated Sep. 1, 2021.

* cited by examiner

FIG. 11

| DATE AND TIME OF OCCURRENCE | ALARM No. | CONTENT |
|---|---|---|
| 2018/10/12 10:36 | 13422 | CLOT WAS DETECTED DURING SUCTION OF SPECIMEN |
| 2018/10/12 14:03 | 13842 | ONLY A FEW NUMBER OF REMAINING TESTS REMAINING |
| 2018/10/12 14:42 | 13821 | OUT OF REAGENT |
| 2018/10/15 7:02 | 13808 | INSUFFICIENT BUFFER SOLUTION |
| 2018/10/15 11:37 | 13475 | INSUFFICIENT AMOUNT OF SPECIMEN |
| 2018/10/15 13:21 | 13199 | EXCESSIVE IMMERSION OF DISPENSING PROBE |
|  |  |  |
|  |  |  |
|  |  |  |

FIG. 12

[CONTROL SETTING IN CASE OF EXCESSIVE IMMERSION OF DISPENSING PROBE]

IMMERSION UPPER LIMIT VALUE  mm

CONTROL IN CASE OF EXCESSIVE IMMERSION

◉ SHIFT TO STOP MODE

○ SHIFT TO PARTIAL STOP MODE

○ MAINTAIN MEASUREMENT MODE

OK

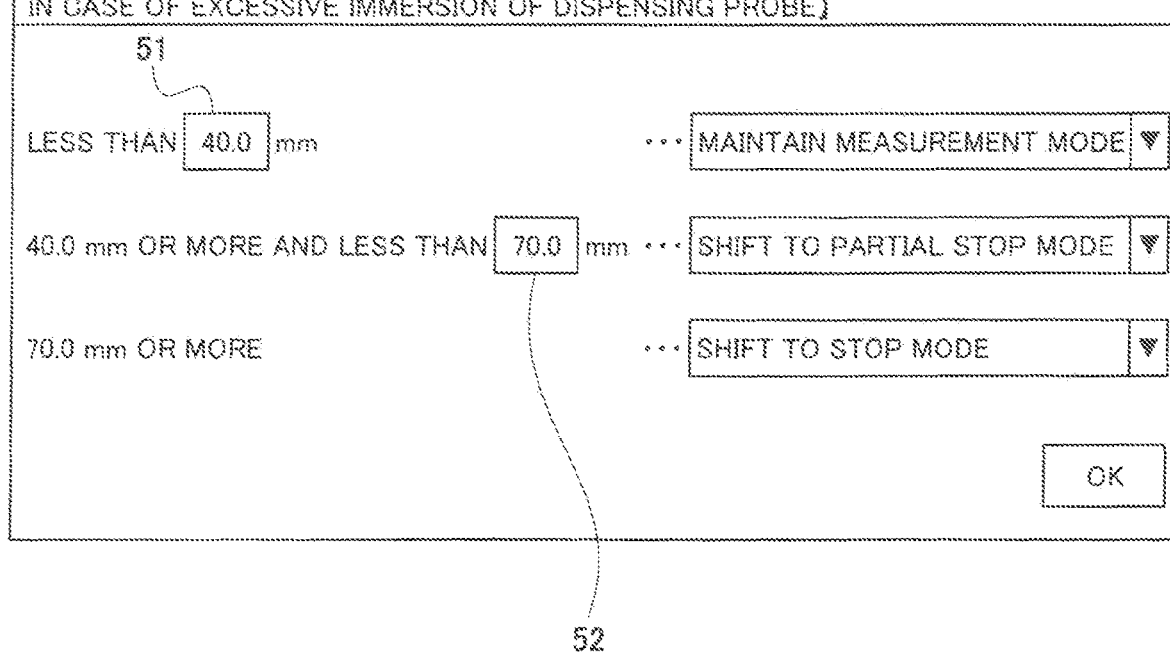

AUTOMATIC ANALYSIS APPARATUS

CROSS-REFERENCE TO RELATED APPLICATION

This application claims priority to Japanese Patent Application No. 2019-010417 filed Jan. 24, 2019, the disclosure of which is hereby incorporated by reference in its entirety.

BACKGROUND

Technical Field

The present invention relates to an automatic analysis apparatus.

Related Art

An automatic analysis apparatus is used for testing in various fields including biochemical test and blood transfusion test. The automatic analysis apparatus performs analysis processing on a large number of specimens simultaneously and analyzes multiple components quickly and precisely. Moreover, the automatic analysis apparatus includes a dispensing probe that sucks and discharges, i.e., dispenses, a liquid, e.g., a specimen or a reagent.

An automatic analysis apparatus including a dispensing probe is described, for example, in JP 2014-194351 A. The automatic analysis apparatus described in JP 2014-A includes a measurement portion, a determination portion, and a notification portion. The measurement portion measures a physical quantity that reflects capacitance between a nozzle, which is one electrode, and a container filled with a liquid, which is the other electrode, when the nozzle (dispensing probe) is outside the liquid. The determination portion determines whether dirt is adhered to the nozzle on the basis of results of a comparison between the measured physical quantity and a predetermined value. The notification portion gives a notice of the result determined by the determination portion.

However, JP 2014-194351 A does not describe processing in the case of excessive immersion in which immersion of the dispensing probe exceeds a predetermined range. Moreover, a subsequent operation in the case where immersion of the dispensing probe is excessive immersion varies with use of the automatic analysis apparatus. Therefore, in the case where immersion of the dispensing probe is excessive immersion, an optimal operation is not executed in some cases.

SUMMARY

It is an object of the present invention to provide an automatic analysis apparatus that is capable of performing an operation depending on use when immersion of a dispensing probe is excessive immersion in view of the aforementioned problem.

In order to solve the aforementioned problem and achieve the object of the present invention, an automatic analysis apparatus includes a measurement portion, an excessive immersion determination portion, a setting input portion, and a control portion. The measurement portion includes a containment unit including a plurality of containers containing a liquid, a dispensing unit including a dispensing probe for dispensing the liquid, and a gauging portion for gauging the liquid dispensed by the dispensing unit. The excessive immersion determination portion determines whether an immersion of the dispensing probe is excessive immersion that exceeds a predetermined range. The setting input portion can select and set an operation of the measurement portion to be performed after the excessive immersion determination portion determines that the immersion is excessive immersion from a plurality of modes. The control portion controls the measurement portion depending on a mode set by the setting input portion.

The automatic analysis apparatus of the present invention can perform an operation depending on use when immersion of the dispensing probe is excessive immersion.

BRIEF DESCRIPTION OF DRAWINGS

FIG. 11 is a view illustrating an example of alarm history according to the first embodiment of the present invention;

FIG. 12 is a view illustrating an example of a control setting screen in the case of excessive immersion of the dispensing probe according to the first embodiment of the present invention;

FIG. 25 is a view illustrating an example of a control setting screen depending on an immersion range of a dispensing probe according to a third embodiment of the present invention.

DETAILED DESCRIPTION

Figure 1:
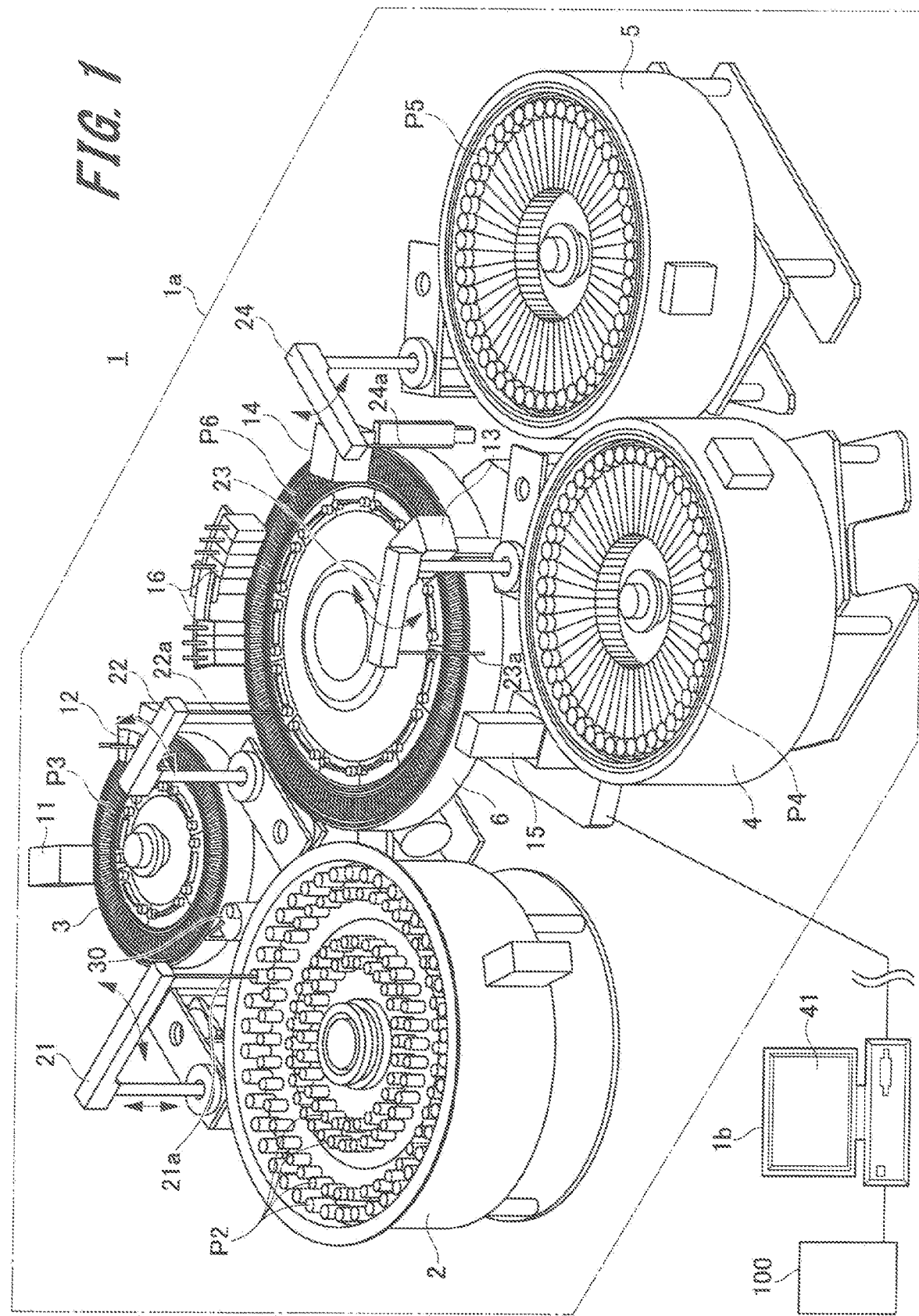
FIG. 1 is a schematic configuration view illustrating an automatic analysis apparatus according to a first embodiment of the present invention.

Embodiments of an automatic analysis apparatus and an automatic analysis method of the present invention are described in detail below on the basis of the drawings. Note that members common in the drawings are designated the same reference numerals.

1. First Embodiment 1-1. Configuration of the Automatic Analysis Apparatus

FIG. 1 is a schematic configuration view illustrating an automatic analysis apparatus according to the first embodiment.

An automatic analysis apparatus 1 illustrated in FIG. 1 is, for example, a biochemical analysis apparatus that automatically measures the amount of a specific component contained in a biological sample, e.g., blood or urine. The automatic analysis apparatus 1 includes a measurement portion 1a and a control portion 1b.

The measurement portion 1a includes, for example, a sample turntable 2, a dilution turntable 3, a first reagent turntable 4, a second reagent turntable 5, and a reaction turntable 6. Moreover, the measurement portion 1a includes a dilution stirring apparatus 11, a dilution cleaning apparatus 12, a first reaction stirring apparatus 13, a second reaction stirring apparatus 14, a multi-wavelength photometer 15, and a reaction container cleaning apparatus 16.

Moreover, the measurement portion 1a includes a specimen dispensing unit 21, a dilute specimen dispensing unit 22, a first reagent dispensing unit 23, a second reagent dispensing unit 24, and a probe cleaning apparatus 30. The measurement portion 1a may further include a cleaned container holding portion, which is not illustrated. The specimen dispensing unit 21, the dilute specimen dispensing unit 22, the first reagent dispensing unit 23, and the second reagent dispensing unit 24 indicate specific examples of the dispensing units of the present invention.

Meanwhile, the control portion 1b includes a display portion 41, and includes an input portion, a storage portion, and a control portion, which will be described in detail below. These constituent elements will be described in detail below in order of the measurement portion 1a and the control portion 1b.

<Measurement Portion 1a>

[Sample Turntable 2]

The sample turntable 2 is one of holding portions that hold a plurality of containers that stores a dispense liquid. The sample turntable 2 is configured to hold a plurality of specimen containers P2 in rows along the periphery thereof and convey the held specimen containers P2 in both directions circumferentially. The sample turntable 2 is rotatably supported by a drive mechanism, which is not illustrated, along a circumferential direction.

Each specimen container P2 held on the sample turntable 2 stores, as a dispense liquid, a specimen to be measured or a control specimen for precision control. The sample turntable 2 is configured such that the various specimens to be measured are held in a predetermined position.

Note that the sample turntable 2 may hold, in addition to the specimen containers P2, a dilution liquid container that stores a dilution liquid or a hemolytic agent container that stores a hemolytic agent for performing hemolytic processing. The immersion cleaning container is as large as the cleaning bath of the probe cleaning apparatus 30, which will be described below, or the specimen container P2. Moreover, the sample turntable 2 described above may have a function of cooling the held specimen containers P2 or other containers.

[Dilution Turntable 3]

The dilution turntable 3 is one of holding portions that hold a plurality of containers that stores a dispense liquid. The dilution turntable 3 is configured to hold a plurality of dilution containers P3 along the periphery thereof and convey the held dilution containers P3 in both directions circumferentially. The dilution turntable 3 is rotatably supported by a drive mechanism, which is not illustrated, along a circumferential direction.

A specimen sucked from the specimen container P2 arranged on the sample turntable 2 and diluted (hereinafter, the "dilute specimen") is injected into the dilution container P3 held on the dilution turntable 3 as a dispense liquid. Note that the automatic analysis apparatus 1 may not include the dilution turntable 3.

[First Reagent Turntable 4 and Second Reagent Turntable 5]

The first reagent turntable 4 holds a plurality of first reagent containers P4 along the periphery thereof, and the second reagent turntable 5 holds a plurality of second reagent containers P5 along the periphery thereof, and the first reagent turntable 4 and the second reagent turntable 5 are configured to convey the held first reagent containers P4 and the held second reagent containers P5 in both directions circumferentially. The first reagent turntable 4 and the second reagent turntable 5 are one of holding portions that hold a plurality of containers that stores a dispense liquid, and are rotatably supported by a drive mechanism, which is not illustrated, along a circumferential direction.

A first reagent is dispensed as a dispense liquid from a reagent bottle into the plurality of first reagent containers P4 held on the first reagent turntable 4. A second reagent is dispensed as a dispense liquid from a reagent bottle into the plurality of second reagent containers P5 held on the second reagent turntable 5.

[Reaction Turntable 6]

The reaction turntable 6 is arranged between the dilution turntable 3, the first reagent turntable 4, and the second reagent turntable 5. The reaction turntable 6 is configured to hold a plurality of reaction containers P6 along the periphery thereof and convey the held reaction containers P6 in both directions circumferentially. The reaction turntable 6 is rotatably supported by a drive mechanism, which is not illustrated, along a circumferential direction.

The dilute specimen collected from the dilution container P3 of the dilution turntable 3 and the first reagent collected form the first reagent container P4 of the first reagent turntable 4 or the second reagent collected form the second reagent container P5 of the second reagent turntable 5 are dispensed into the reaction containers P6 held on the reaction turntable 6 at a predetermined amount. Then, the dilute specimen and the first reagent or the second reagent are stirred and reacted in the reaction container P6.

The reaction turntable 6 described above is configured to keep the temperature of the reaction container P6 constant at any time with a constant temperature bath, which is not illustrated. Note that when the automatic analysis apparatus 1 does not include the dilution turntable 3, a specimen collected from the specimen container P2 of the sample turntable 2 is dispensed into the reaction container P6 held on the reaction turntable 6.

[Dilution Stirring Apparatus 11]

The dilution stirring apparatus 11 is arranged around the dilution turntable 3. The dilution stirring apparatus 11 includes a stirring mechanism and a drive mechanism for driving the stirring mechanism. The dilution stirring apparatus 11 inserts a stir bar, which is not illustrated, into the dilution container P3 held on the dilution turntable 3 and stirs the specimen to be measured and a dilution liquid.

[Dilution Cleaning Apparatus 12]

The dilution cleaning apparatus 12 is arranged around the dilution turntable 3. The dilution cleaning apparatus 12 is an apparatus for cleaning the dilution container P3 from which the dilute specimen has been sucked by the dilute specimen dispensing unit 22, which will be described below.

[First Reaction Stirring Apparatus 13 and Second Reaction Stirring Apparatus 14]

The first reaction stirring apparatus 13 and the second reaction stirring apparatus 14 are arranged around the reaction turntable 6. The first reaction stirring apparatus 13 and the second reaction stirring apparatus 14 stir the dilute specimen and the first reagent or the second reagent in the reaction container P6 held on the reaction turntable 6.

The first reaction stirring apparatus 13 and the second reaction stirring apparatus 14 include a stirring mechanism and a drive mechanism for driving the stirring mechanism. The first reaction stirring apparatus 13 and the second reaction stirring apparatus 14 insert a stir bar, which is not illustrated, into the reaction container P6 held in a predetermined position on the reaction turntable 6 and stir the dilute specimen (or specimen) and the first reagent or the second reagent, thereby promoting reaction of the dilute specimen and the first reagent or the second reagent.

[Multi-Wavelength Photometer 15]

The multi-wavelength photometer 15 is a specific example of the gauging portion of the present invention and is arranged to face an outer wall of the reaction turntable 6 around the reaction turntable 6. The multi-wavelength photometer 15 performs optical measurement on the dilute specimen reacted with the first reagent or the second reagent in the reaction container P6, outputs the amount of various components of the specimen as absorbance, and detects a reaction state of the dilute specimen.

[Reaction Container Cleaning Apparatus 16]

The reaction container cleaning apparatus 16 is arranged around the reaction turntable 6. The reaction container cleaning apparatus 16 is an apparatus that cleans the interior of the reaction container P6 for which test has ended.

[Specimen Dispensing Unit 21]

The specimen dispensing unit 21 includes a specimen probe 21a as a dispensing probe having a small tube shape. The specimen dispensing unit 21 is arranged around the sample turntable 2 and the dilution turntable 3. The specimen dispensing unit 21 inserts an end of the specimen probe 21a the axial direction of which is held vertically into the specimen in the specimen container P2 held on the sample turntable 2 or into the specimen in the specimen container conveyed by a specimen feed apparatus 100, which will be described below, with a drive mechanism, which is not illustrated, according to a preset measurement program. Thus, a predetermined amount of specimen is sucked into the specimen probe 21a. In this case, the sample turntable 2, according to a preset measurement program, moves the specimen container P2 held in a predetermined position on the sample turntable 2 to a predetermined specimen collection position in advance. Moreover, in this case, the specimen feed apparatus 100, according to a preset measurement program, moves the specimen container held on a specimen rack, which will be described below, to a predetermined specimen collection position in advance.

Moreover, the specimen dispensing unit 21 inserts the end of the specimen probe 21a into the dilution container P3 of the dilution turntable 3, and discharges the specimen sucked into the specimen probe 21a and a predetermined amount of dilution liquid (e.g., saline or deionized water) fed from the specimen dispensing unit 21 itself into the dilution container P3. Thus, the specimen to be measured is diluted to a concentration of a predetermined times in the dilution container P3.

Note that when the automatic analysis apparatus 1 does not include the dilution turntable 3, the specimen dispensing unit 21 inserts the end of the specimen probe 21a into the reaction container P6 of the reaction turntable 6. Then, the specimen dispensing unit 21 discharges the specimen sucked into the specimen probe 21a and a predetermined amount of dilution liquid (e.g., saline or deionized water) fed from the specimen dispensing unit 21 itself into the reaction container P6.

Moreover, the specimen probe 21a includes a liquid surface detection mechanism, which is not illustrated. The liquid surface detection mechanism is to detect contact between the end of the specimen probe 21a and the liquid surface, for example, according to capacitance between the liquid surface and the end of the specimen probe 21a.

[Dilute Specimen Dispensing Unit 22]

The dilute specimen dispensing unit 22 includes a dilute specimen probe 22a, which is a dispensing probe having a small tube shape, and is arranged between the dilution turntable 3 and the reaction turntable 6. The dilute specimen dispensing unit 22, according to a preset measurement program, inserts an end of the dilute specimen probe 22a the axial direction of which is held vertically into the dilution container P3 of the dilution turntable 3 with a drive mechanism, which is not illustrated. The dilute specimen dispensing unit 22 sucks a predetermined amount of dilute specimen through the end of the dilute specimen probe 22a, which is filled with a dilution liquid, via an air lock.

Moreover, the dilute specimen dispensing unit 22 inserts the end of the dilute specimen probe 22a into the reaction container P6 of the reaction turntable 6, and discharges the dilute specimen sucked into the dilute specimen probe 22a into the reaction container P6. Note that when the automatic analysis apparatus 1 does not include the dilution turntable 3, the automatic analysis apparatus 1 may not necessarily include the dilute specimen dispensing unit 22.

[First Reagent Dispensing Unit 23]

The first reagent dispensing unit 23 includes a first reagent probe 23a as a dispensing probe having a small tube shape. The first reagent dispensing unit 23 is arranged between the reaction turntable 6 and the first reagent turntable 4. The first reagent dispensing unit 23, according to a preset measurement program, inserts an end of the first reagent probe 23a the axial direction of which is held vertically into the first reagent container P4 of the first reagent turntable 4 with a drive mechanism, which is not illustrated. Then, the first reagent dispensing unit 23 sucks a predetermined amount of first reagent through the end of the first reagent probe 23a, which is filled with a dilution liquid, via an air lock. Moreover, the first reagent dispensing unit 23 inserts the end of the first reagent probe 23a into the reaction container P6 of the reaction turntable 6 and discharges the first reagent, which has been sucked into the first reagent probe 23a, into the reaction container P6.

[Second Reagent Dispensing Unit 24]

The second reagent dispensing unit 24 includes a second reagent probe 24a as a dispensing probe having a small tube shape. The second reagent dispensing unit 24 is arranged between the reaction turntable 6 and the second reagent turntable 5. The second reagent dispensing unit 24, according to a preset measurement program, inserts an end of the second reagent probe 24a the axial direction of which is held vertically into the second reagent container P5 of the second reagent turntable 5 with a drive mechanism, which is not illustrated. Then, the second reagent dispensing unit 24 sucks a predetermined amount of second reagent through the end of the second reagent probe 24a, which is filled with a dilution liquid, via an air lock. Moreover, the second reagent dispensing unit 24 inserts the end of the second reagent probe 24a into the reaction container P6 of the reaction turntable 6 and discharges the second reagent, which has been sucked into the second reagent probe 24a, into the reaction container P6.

[Probe Cleaning Apparatus 30]

The probe cleaning apparatus 30 is to immerse and clean the specimen probe 21a of the specimen dispensing unit 21 and is arranged on the track of the movement of the specimen probe 21a. Here, as an example, the probe cleaning apparatus 30 is assumed to be provided on the track of the specimen probe 21a between the sample turntable 2 and the dilution turntable 3.

The probe cleaning apparatus 30 includes a cleaning liquid feed pipe and a cleaning bath. The cleaning liquid feed pipe feeds a cleaning liquid in the form of shower to the end of the specimen probe 21a arranged in an upper part of the cleaning bath to clean the outer wall of the specimen probe 21a.

<Control Portion 1b>

The control portion 1b is connected to the drive mechanisms of the constituent elements and the multi-wavelength photometer 15, which constitute the aforementioned measurement portion 1a, and to the specimen feed apparatus 100 for feeding the specimen to the measurement portion 1a. The specimen feed apparatus 100 includes a feed portion for feeding a specimen rack that contains a plurality of (e.g., five) specimens, and a retrieval portion for retrieving the specimen rack for which dispensing processing by the specimen dispensing unit 21 has been performed. Moreover, the specimen feed apparatus 100 includes a conveyance portion for conveying the specimen rack from the feed portion to the retrieval portion, and a barcode reader arranged between the feed portion and a specimen collection position. When an operator puts a specimen rack into the feed portion, the conveyance portion conveys the specimen rack to a barcode read position of the barcode reader. The barcode reader reads barcode information attached to the specimen container. Then, the conveyance portion conveys the specimen rack to the specimen collection position and, when the dispensing processing by the specimen dispensing unit 21 ends, conveys the specimen rack to the retrieval portion.

Figure 2:
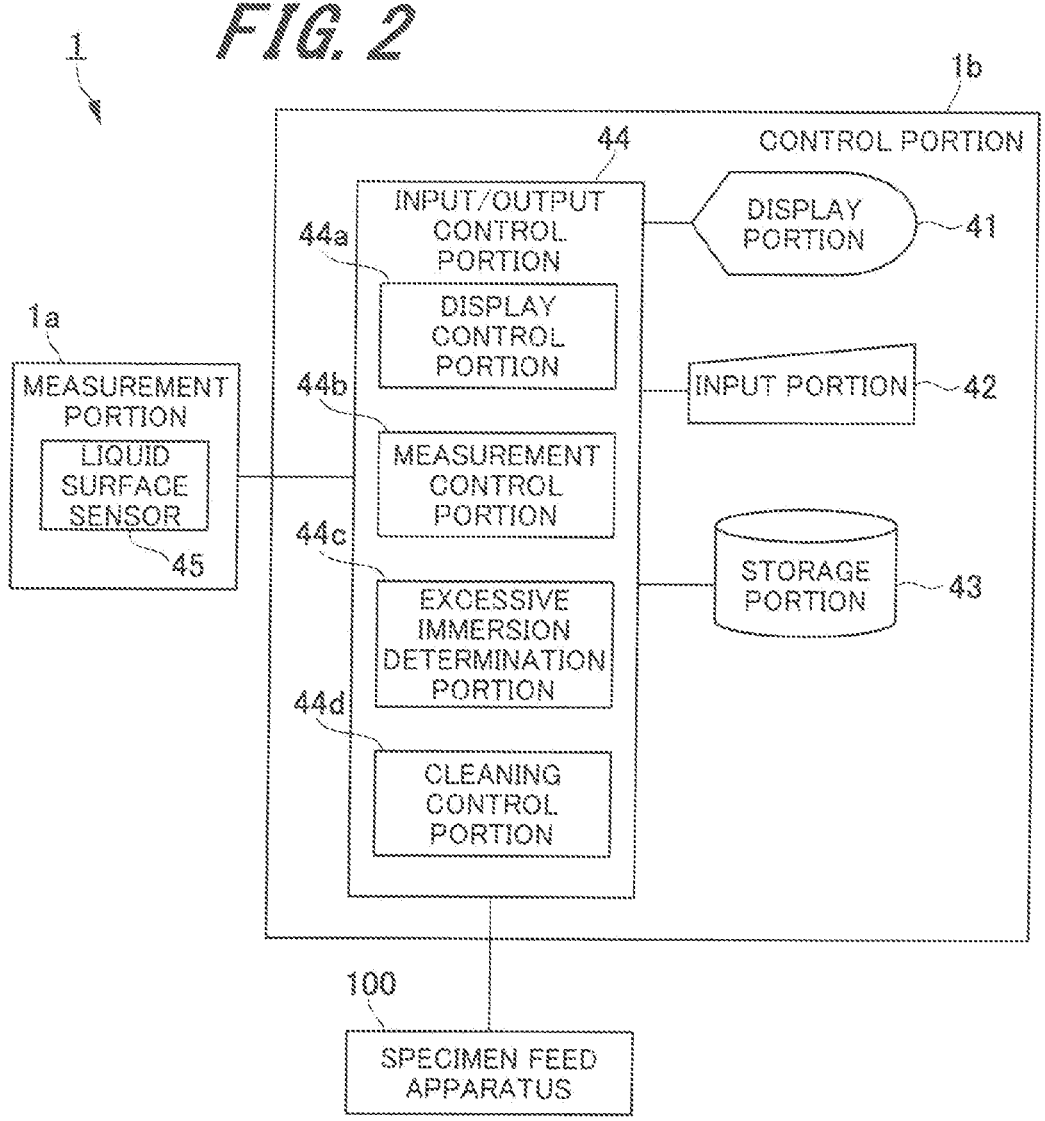
FIG. 2 is a block diagram of the automatic analysis apparatus according to the first embodiment of the present invention.

FIG. 2 is a block diagram of the automatic analysis apparatus 1 according to the embodiment.

A configuration of the control portion 1b illustrated in FIG. 2 is described below with reference to FIG. 1 indicated above. As illustrated in FIG. 2, the control portion 1b includes a display portion 41, an input portion 42, a storage portion 43, and an input/output control portion 44. Details of these constituent elements are described below.

[Display Portion 41]

The display portion 41 displays results of the measurement by the multi-wavelength photometer 15, and various setting information or various history information of the automatic analysis apparatus 1. As the display portion 41, for example, a liquid crystal display apparatus is used.

Moreover, the display portion 41 also includes an alarm output portion that outputs an alarm. The alarm output portion is not limited to the display portion 41, but may be a speaker, which is not illustrated, or may be both the display portion 41 and the speaker.

[Input Portion 42]

The input portion 42 is an example of the setting input portion of the present invention. The input portion 42 receives input related to various settings or other input performed by an operator of the automatic analysis apparatus 1, and outputs an input signal to the input/output control portion 44. As the input portion 42, for example, a mouse, a keyboard, or a touch panel provided on a display surface of the display portion 41 is used.

[Storage Portion 43]

The storage portion 43 includes, for example, a mass storage apparatus, e.g., HDD (hard disk drive) or a semiconductor memory. The storage portion 43 stores various programs executed by the input/output control portion 44, which will be described below, and the aforementioned various setting information or various history information.

[Input/Output Control Portion 44]

The input/output control portion 44 includes a calculator, e.g., a microcomputer. The calculator includes a storage portion, e.g., a CPU (central processing unit), a ROM (read only memory), and a RAM (random access memory), and controls an operation of each portion in the automatic analysis apparatus 1. The input/output control portion 44 includes portions: a display control portion 44a, a measurement control portion 44b, an excessive immersion determination portion 44c, and a cleaning control portion 44d.

The display control portion 44a creates a display screen related to various setting information or various history information of the automatic analysis apparatus 1 in addition to the results of the measurement by the multi-wavelength photometer 15, and displays the created display screen on the display portion 41. The various setting information and various history information include setting information and history information related to the case of excessive immersion of the dispensing probe.

The measurement control portion 44b is an example of the control portion of the present invention. The measurement control portion 44b controls the timing of an operation of each drive mechanism constituting the measurement portion 1a and controls the timing of measurement of luminous intensity with the multi-wavelength photometer 15. The measurement control portion 44b controls the specimen dispensing unit 21 to collect the specimens in order in a predetermined cycle from the plurality of specimen containers P2 held on the sample turntable 2.

Moreover, the measurement control portion 44b controls the drive mechanisms such that the specimen in each specimen container P2 held on the sample turntable 2 is diluted to a predetermined concentration, the dilute specimen is mixed and reacted with the first reagent and the second reagent, and the absorbance of the resulting reaction liquid is measured.

The excessive immersion determination portion 44c is connected to a liquid surface sensor 45. The liquid surface sensor 45 outputs a signal depending on a contact state of a liquid of the specimen (dispensing) probe to the excessive immersion determination portion 44c. The excessive immersion determination portion 44c determines whether an immersion of the specimen (dispensing) probe is excessive immersion that exceeds a predetermined range on the basis of the output of the liquid surface sensor 45. Moreover, the excessive immersion determination portion 44c, when the immersion of the specimen probe is excessive immersion, instructs the display control portion 44a to output an alarm to the display portion 41 (alarm output portion).

Such excessive immersion determination portion 44c determines whether immersion is excessive immersion on the basis of the setting information stored in the storage portion 43, a signal from the liquid surface sensor 45 provided on the specimen probe 21a, or the like. Details of determination as to whether immersion is excessive immersion by the excessive immersion determination portion 44c will be described with respect to an excessive immersion determination method below.

The cleaning control portion 44d controls the probe cleaning apparatus 30 and the drive mechanism of the specimen dispensing unit 21 so as to control a cleaning operation of the specimen probe 21a.

<Configuration of the Dispensing Unit>

Next, a specific configuration of the dispensing unit is described with reference to FIGS. 3 and 4.

Figure 3:
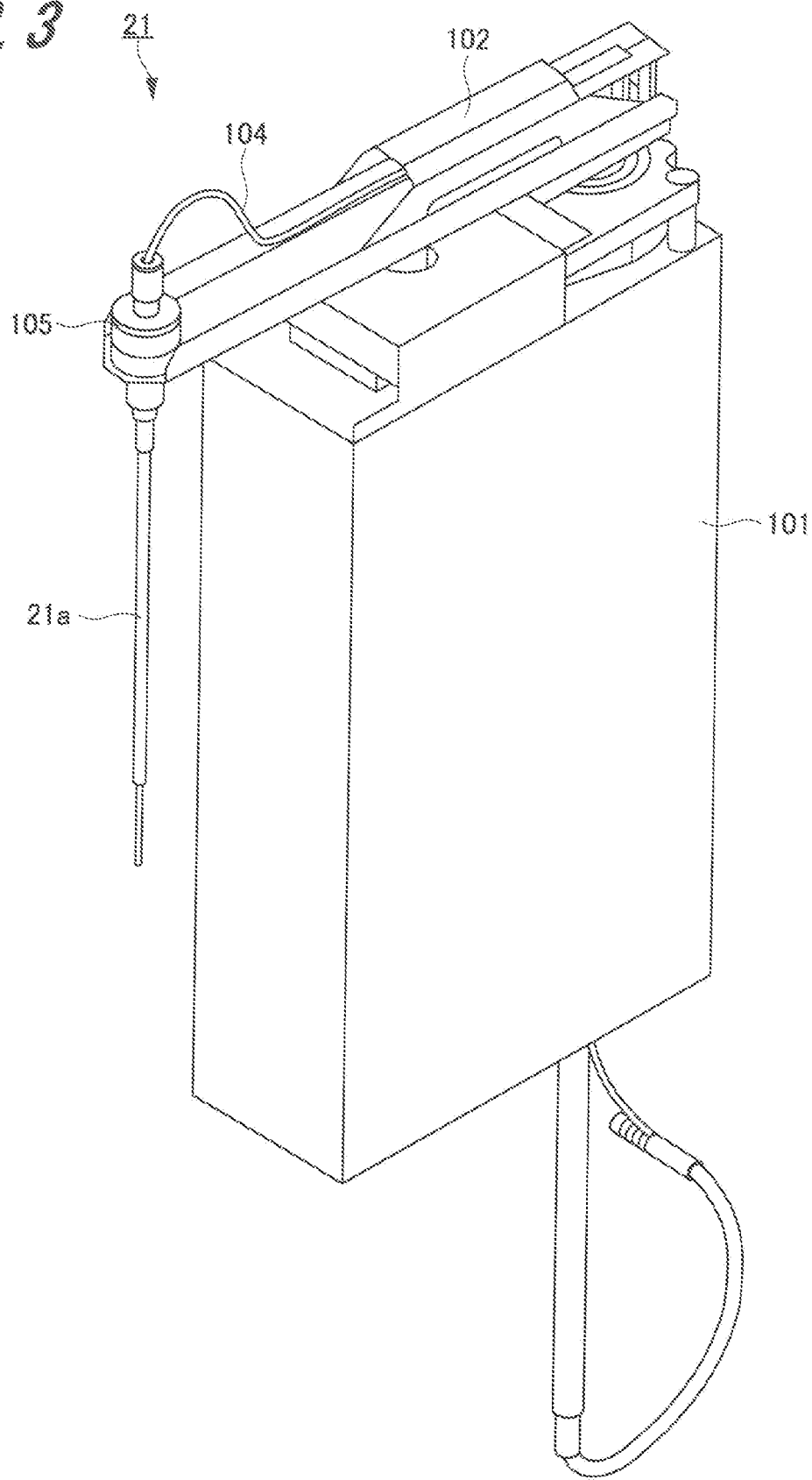
FIG. 3 is a perspective view illustrating a dispensing unit according to the first embodiment of the present invention.

FIG. 3 is a perspective view illustrating the dispensing unit according to the first embodiment. FIG. 4 is a cross-sectional view illustrating the dispensing probe of the dispensing unit according to the first embodiment.

Note that the specimen dispensing unit 21, the dilute specimen dispensing unit 22, the first reagent dispensing unit 23, and the second reagent dispensing unit have the same configuration. Therefore, here, a description is given of the specimen dispensing unit 21. Hereinafter, the specimen dispensing unit 21 is simply called the dispensing unit 21, and the specimen probe 21a is simply called the dispensing probe 21a.

Figure 4:
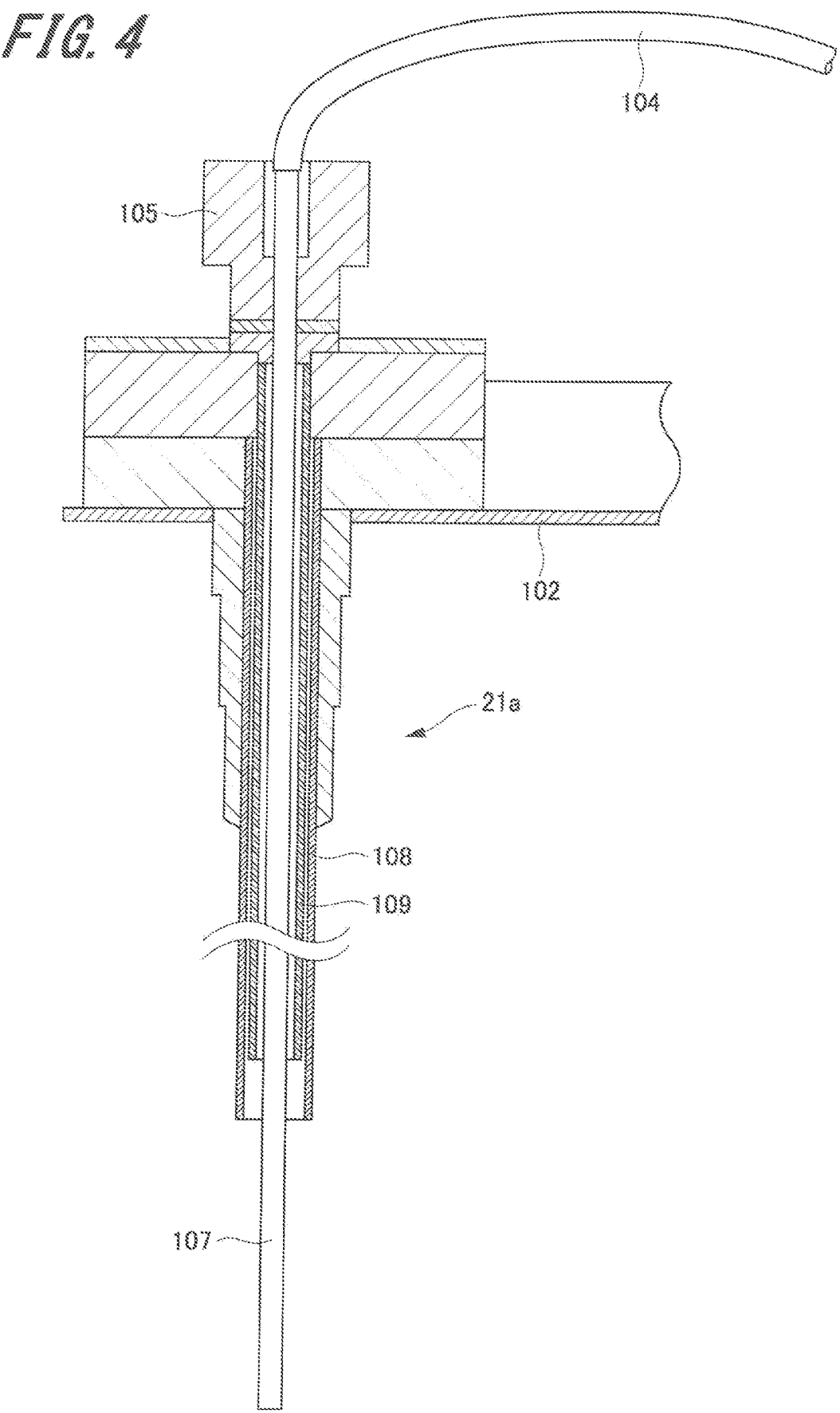
FIG. 4 is a cross-sectional view illustrating a dispensing probe of the dispensing unit according to the first embodiment of the present invention.

As illustrated in FIGS. 3 and 4, the dispensing unit 21 includes a drive mechanism 101, a support arm 102, the dispensing probe 21a, a resin tube 104, and a pump, which is not illustrated. The support arm 102 is supported on the drive mechanism 101 so as to be movable in an up-and-down direction and rotatable in a horizontal direction. The dispensing probe 21a is provided at an end of the support arm 102 which is opposite to the end supported on the drive mechanism 101. Moreover, a drive portion for moving the dispensing probe 21a via the support arm 102 is provided on the drive mechanism 101.

The dispensing probe 21a is detachably attached to the support arm 102 via a fixation member 105. Then, the dispensing probe 21a protrudes downward in the up-and-down direction from the end of the support arm 102.

As illustrated in FIG. 4, the dispensing probe 21a includes an inner pipe 107, an outer pipe 108, and an insulation member 109 interposed between the inner pipe 107 and the outer pipe 108. The inner pipe 107 includes a conductive member. The resin tube 104 made of a material different from that of the inner pipe 107 is connected to an end of the inner pipe 107 on the support arm 102 side. That is, the inner pipe 107 is communicated with the resin tube 104.

The resin tube 104 extends to the drive mechanism 101 along the support arm 102. One end of the resin tube 104 is connected to the inner pipe 107, and the other end is connected to the pump (not illustrated). When the pump is driven, the specimen is sucked to the inner pipe 107 via the resin tube 104, and the sucked specimen is contained in the inner pipe 107 and the resin tube 104.

The inner pipe 107 and the resin tube 104 are filled with deionized water, which is system water. Moreover, an air lock is inserted at an end of the inner pipe 107 opposite from the resin tube 104, i.e., an end that contacts the specimen. Thus, the specimen can be prevented from being mixed with the deionized water by the air lock when the specimen is sucked by the inner pipe 107.

Note that the liquid preliminarily charged into the inner pipe 107 and the resin tube 104 is not limited to non-conductive deionized water, but conductive saline or other various liquids may be charged.

The liquid surface sensor 45 (see FIG. 2) is connected to the inner pipe 107 and the outer pipe 108 of the dispensing probe 21a. Then, the liquid surface sensor 45 detects a value of capacitance of the inner pipe 107 and the outer pipe 108. A value detected by the liquid surface sensor 45 is output to the excessive immersion determination portion 44c. Then, the excessive immersion determination portion 44c determines whether an immersion of the specimen (dispensing) probe is excessive immersion that exceeds a predetermined range on the basis of the value (sensor detection value) detected by the liquid surface sensor 45.

1-2. Excessive Immersion Determination Method

Next, a method of determining excessive immersion of the dispensing probe 21a is described.

<First Determination Method>

Figure 5:
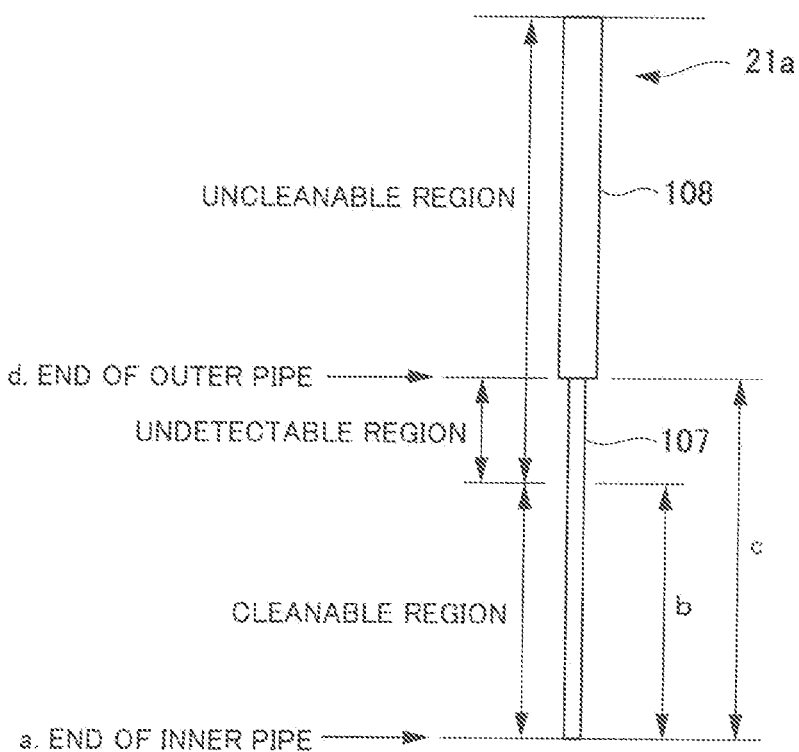
FIG. 5 is an explanatory view for explaining excessive immersion of the dispensing probe according to the present invention.
Figure 6:
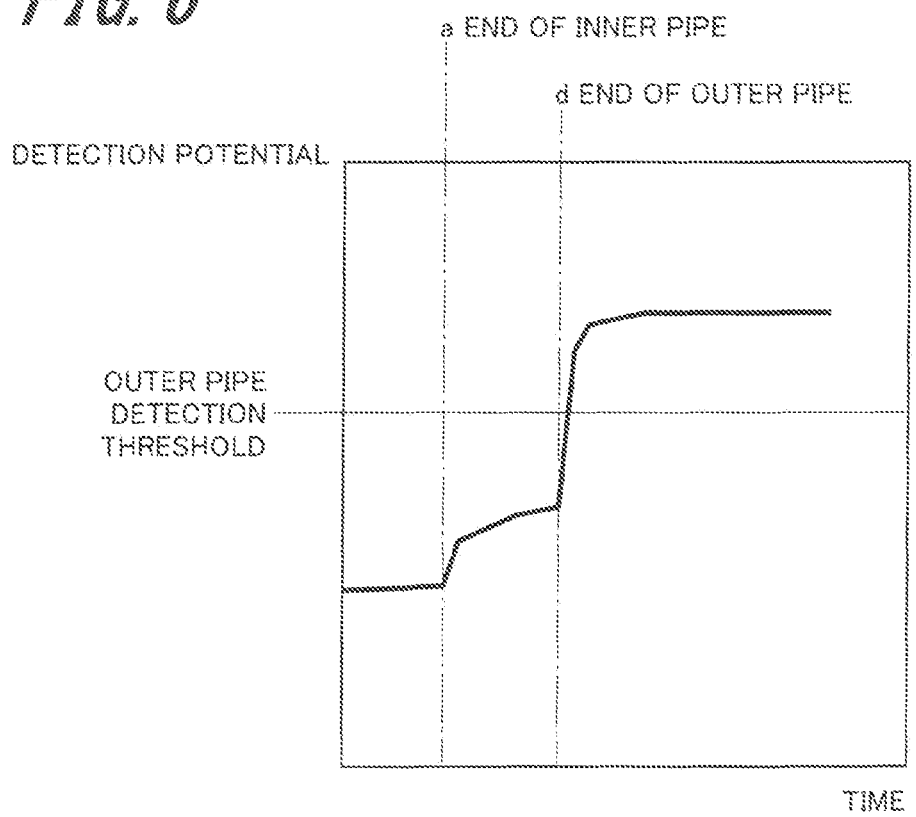
FIG. 6 is a graph illustrating a first example of an output signal of a liquid surface sensor according to the present invention.

FIG. 5 is an explanatory view for explaining excessive immersion of the dispensing probe 21a. FIG. 6 is a graph illustrating a first example of an output signal of the liquid surface sensor 45.

As illustrated in FIG. 5, a region of the dispensing probe 21a from an end a of the inner pipe 107 to a predetermined distance b is a region that can be cleaned by the aforementioned probe cleaning apparatus 30. Moreover, the predetermined distance b is shorter than an inner pipe length c, a length of the inner pipe 107 protruding from the outer pipe 108. Accordingly, the cleanable region of the dispensing probe 21a is a part of the inner pipe 107. Then, a region above the predetermined distance b is an uncleanable region.

As illustrated in FIG. 6, when the end a of the inner pipe 107 contacts the liquid surface, a detection potential by the liquid surface sensor 45 becomes high. Then, when an end d of the outer pipe 108 contacts the liquid surface, a detection potential by the liquid surface sensor 45 becomes higher than the detection potential of the case where the end a of the inner pipe 107 contacts the liquid surface.

Therefore, in the first determination method for excessive immersion, when a preset outer pipe detection threshold is exceeded, it is determined that the end d of the outer pipe 108 contacts the liquid surface, and it is determined that immersion is excessive immersion in which the liquid surface exceeds the cleanable region. That is, the excessive immersion determination portion 44c determines that immersion is excessive immersion when a detection potential by the liquid surface sensor 45 exceeds the outer pipe detection threshold. Note that the outer pipe detection threshold is set to a value higher than the detection potential immediately before contact between the end d of the outer pipe 108 and the liquid surface and a value lower than the detection potential stabilized after the end d of the outer pipe 108 contacts the liquid surface.

Such first determination method for excessive immersion does not determine that immersion is excessive immersion until the end d of the outer pipe 108 contacts the liquid surface. Therefore, even when the liquid surface is present in the region from the predetermined distance b to the end d of the outer pipe 108 in the uncleanable region, it is not determined that immersion is excessive immersion. Accordingly, the first determination method for excessive immersion generates an undetectable region over which excessive immersion cannot be detected.

<Second Determination Method>

Figure 7:
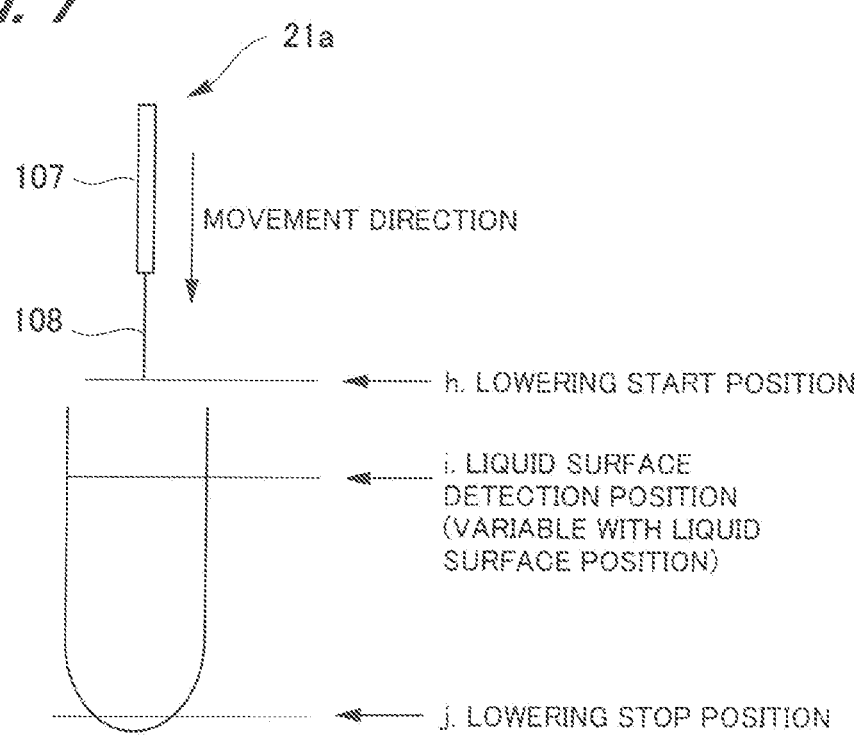
FIG. 7 is an explanatory view for explaining lowering operation of the dispensing probe according to the present invention.
Figure 8:
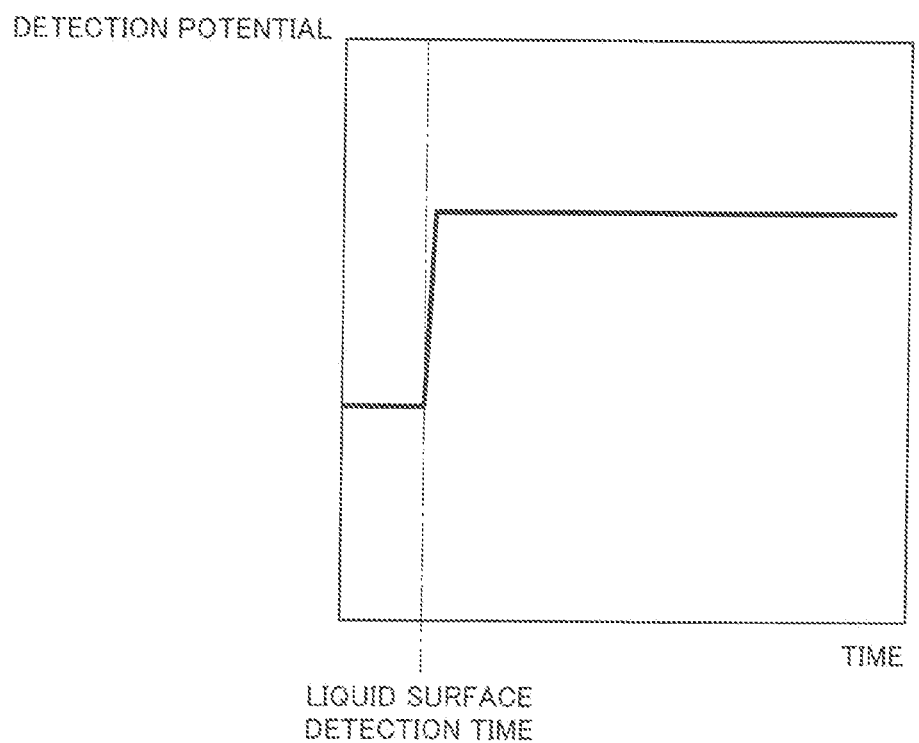
FIG. 8 is a graph illustrating a second example of an output signal of a liquid surface sensor according to the present invention.
Figure 9:
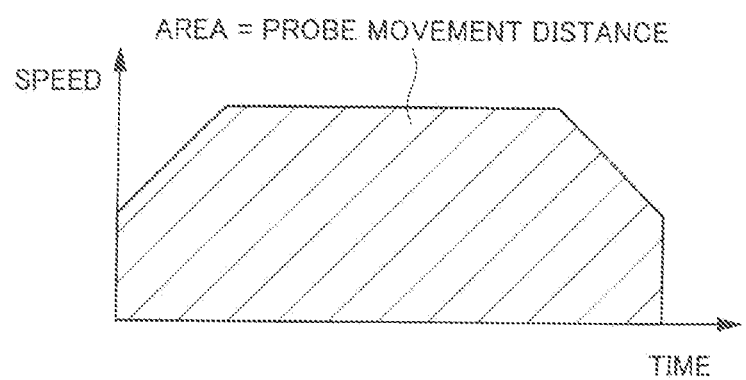
FIG. 9 is a graph for explaining movement distance of the dispensing probe according to the present invention.
Figure 10:
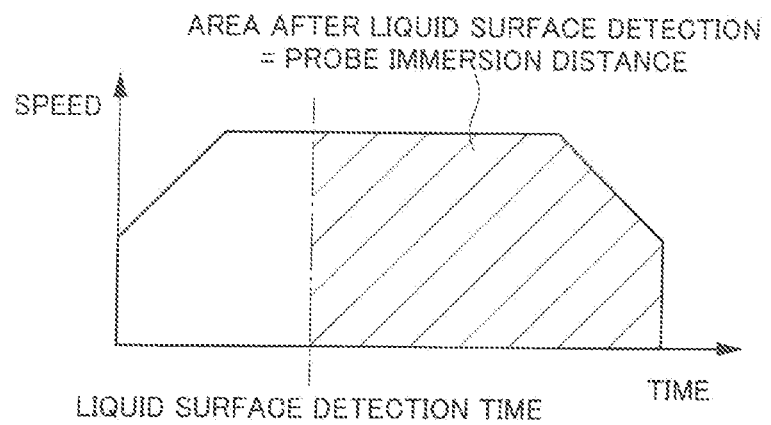
FIG. 10 is a graph for explaining immersion distance of the dispensing probe according to the present invention.
Figure 13:
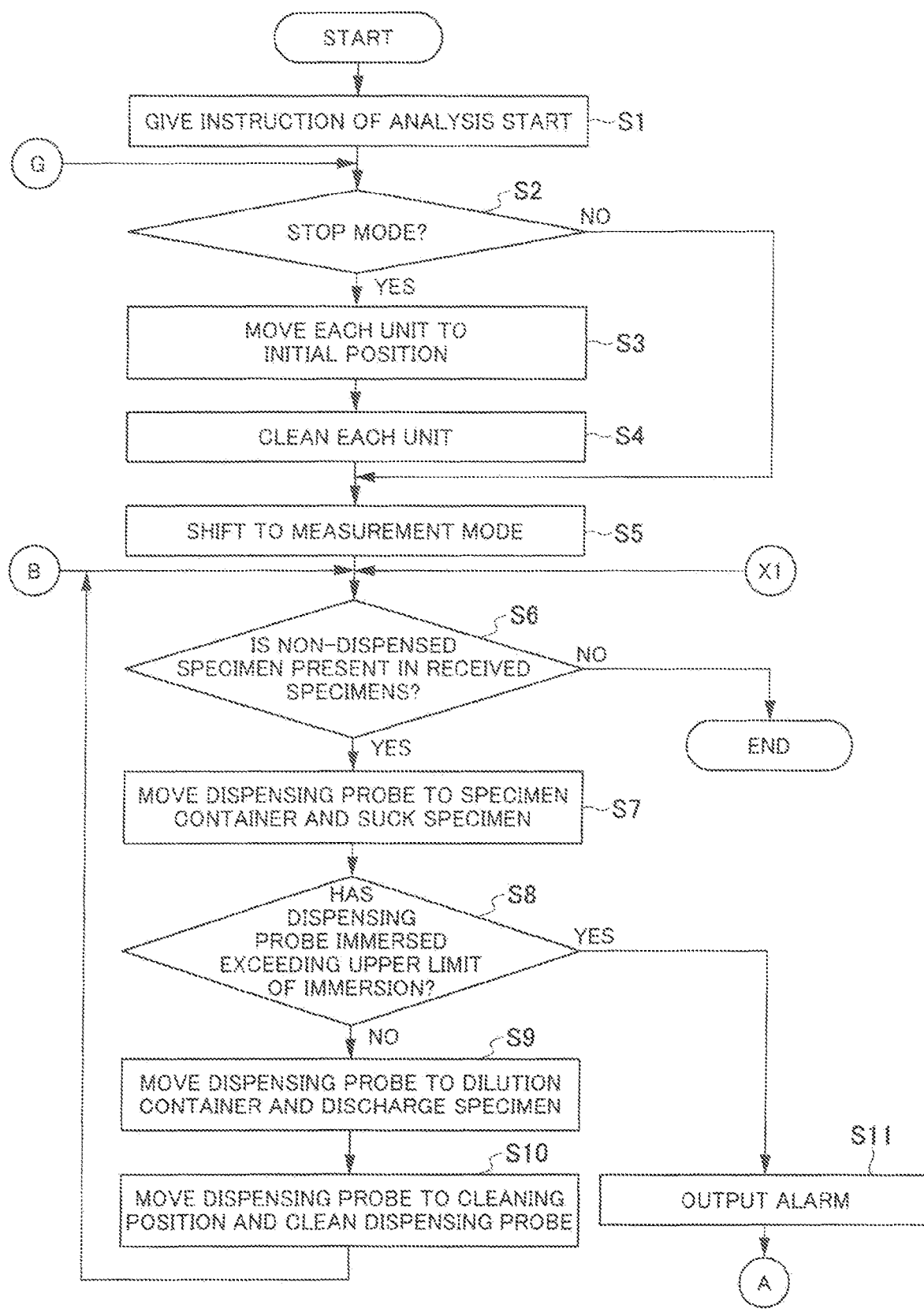
FIG. 13 is a flowchart illustrating an example of dispensing processing according to the first embodiment of the present invention.
Figure 14:
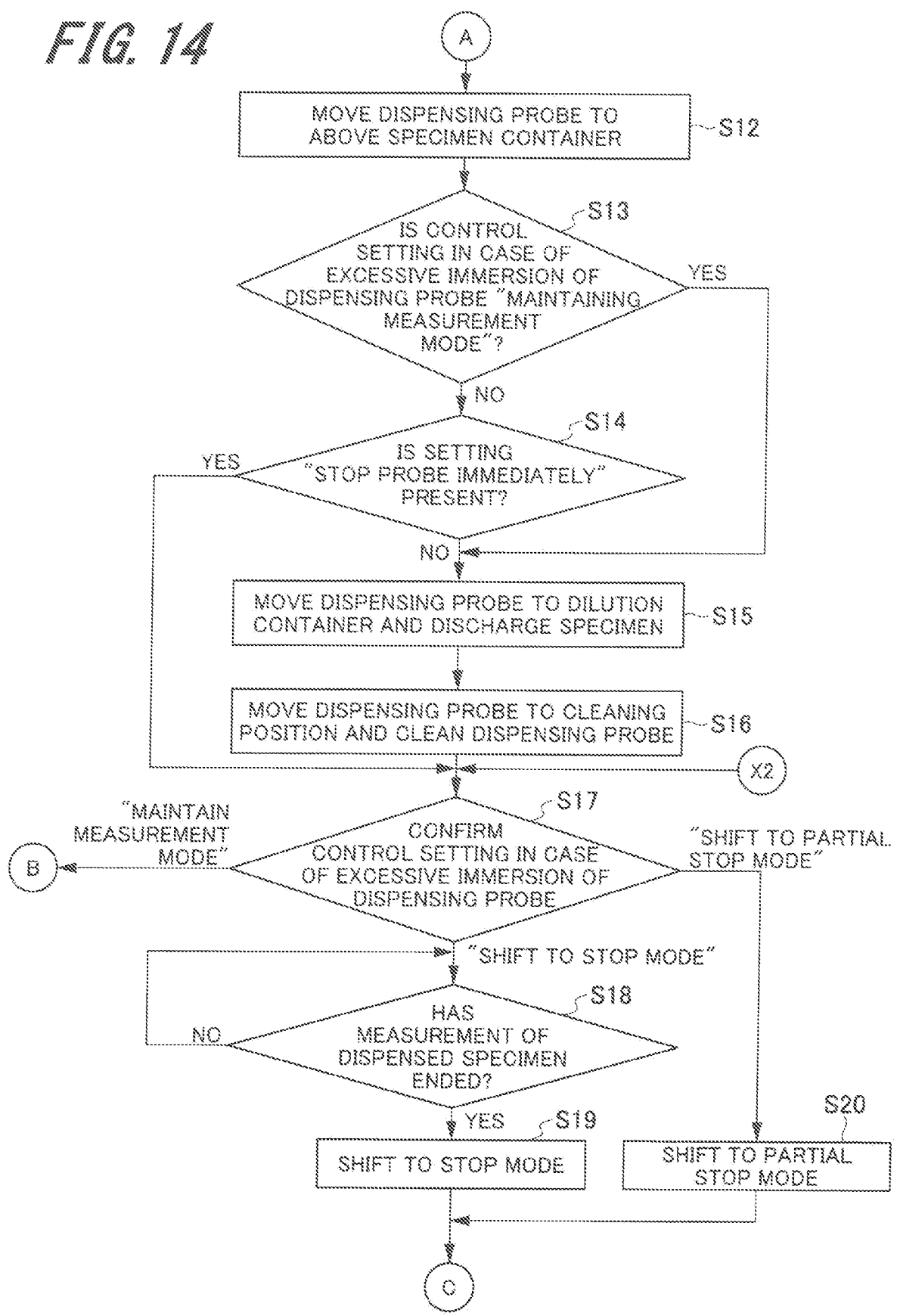
FIG. 14 is a flowchart illustrating an example of dispensing processing according to the first embodiment of the present invention.
Figure 15:
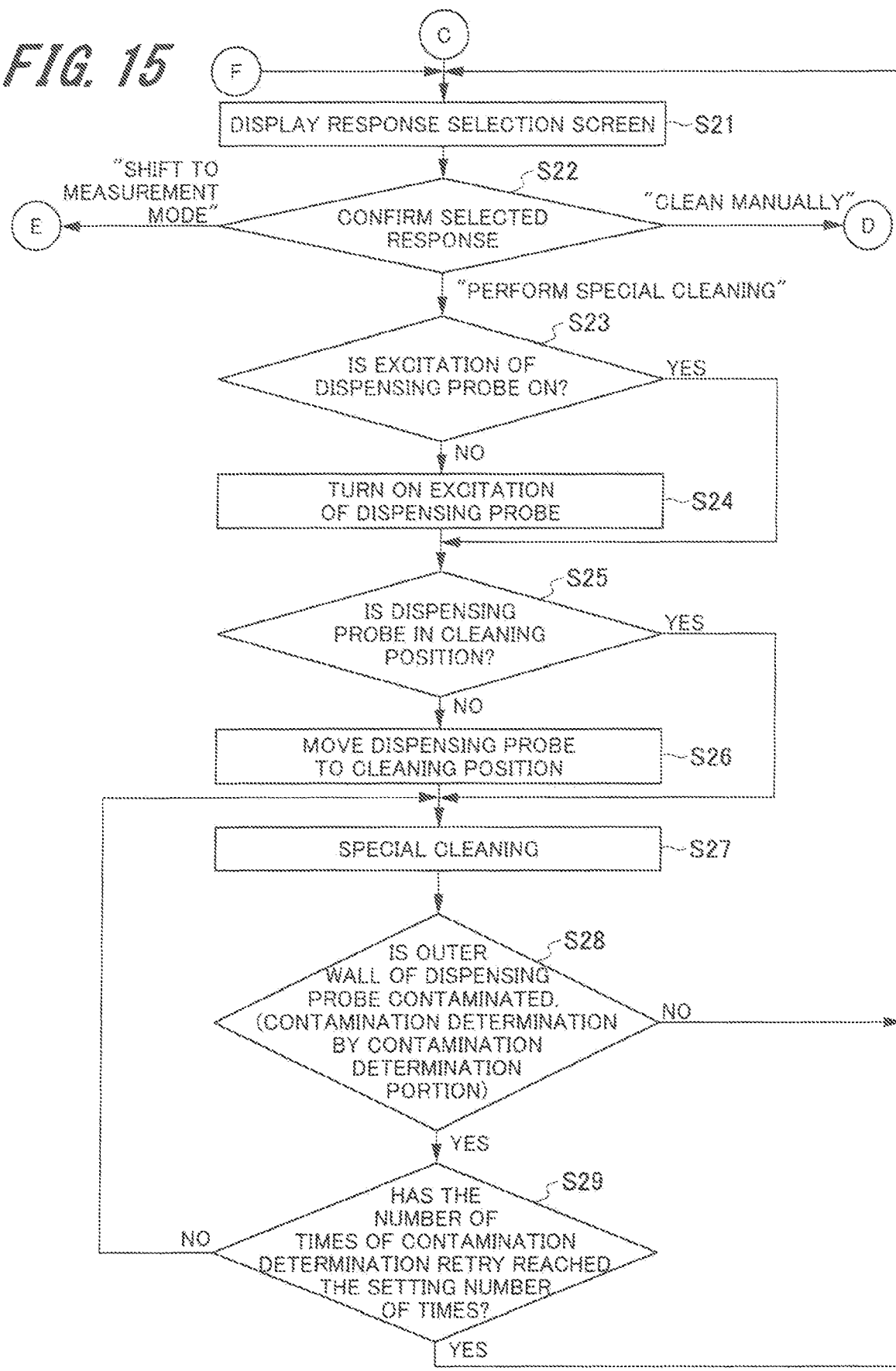
FIG. 15 is a flowchart illustrating an example of dispensing processing according to the first embodiment of the present invention.
Figure 16:
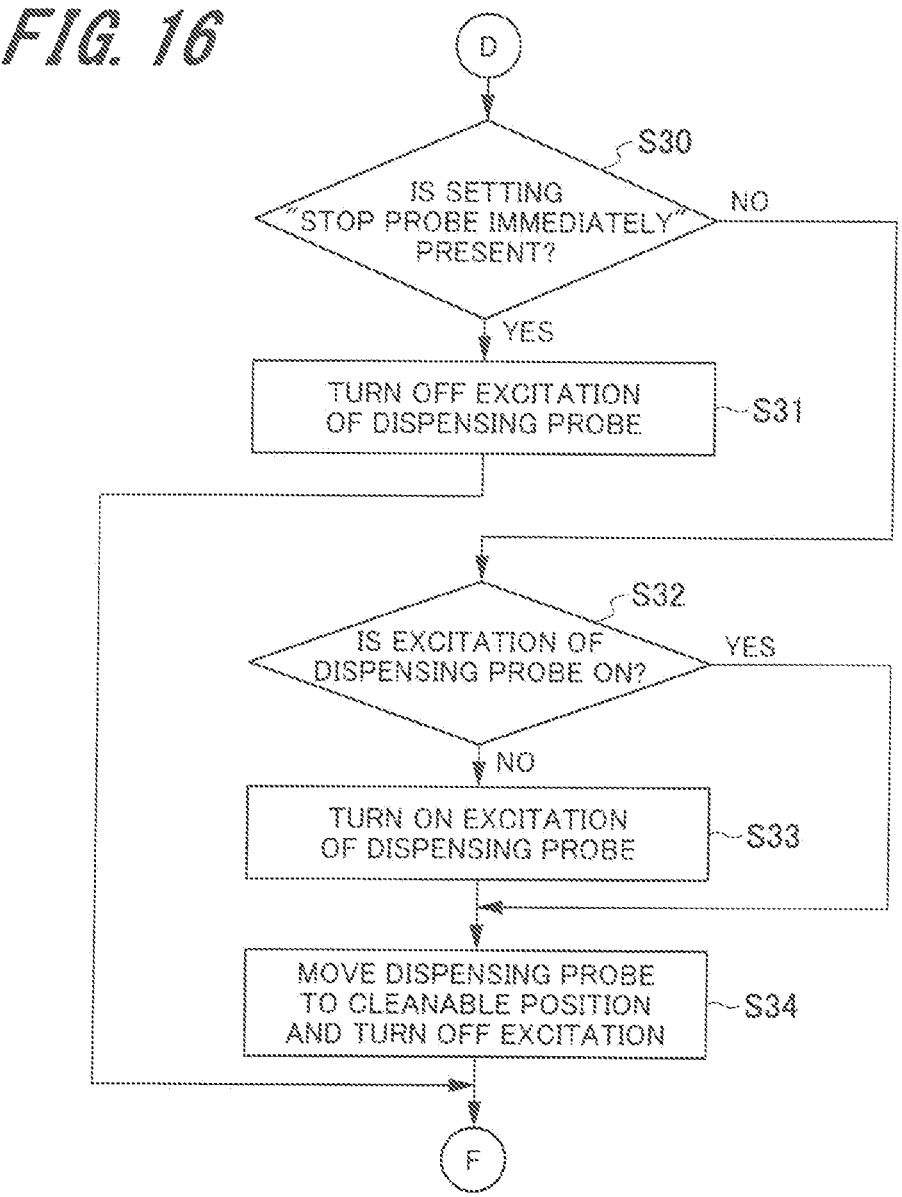
FIG. 16 is a flowchart illustrating an example of dispensing processing according to the first embodiment of the present invention.
Figure 17:
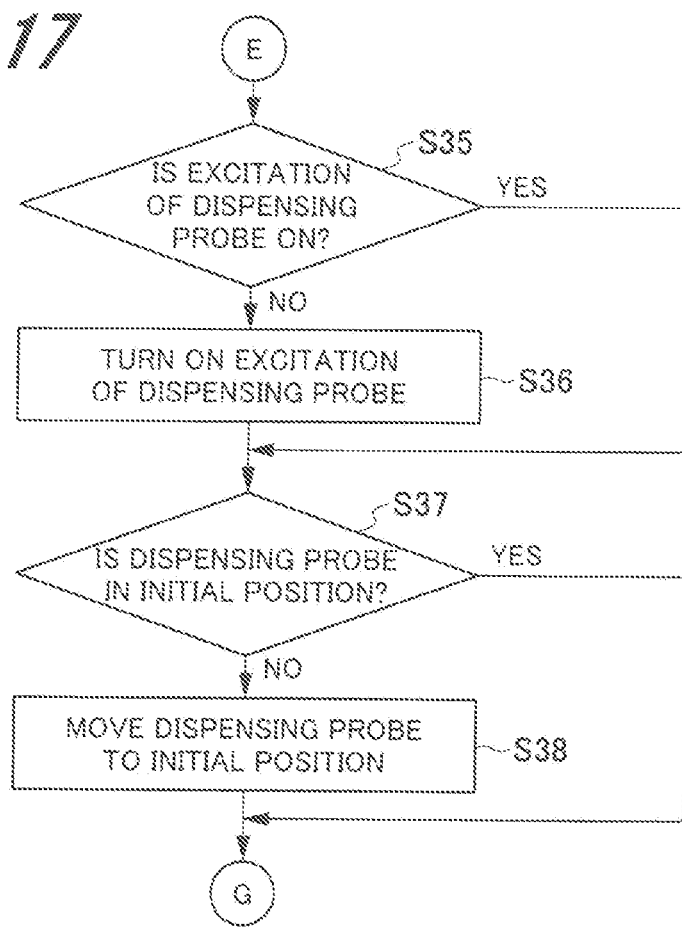
FIG. 17 is a flowchart illustrating an example of dispensing processing according to the first embodiment of the present invention.

FIG. 7 is an explanatory view for explaining lowering operation of the dispensing probe 21a. FIG. 8 is a graph illustrating a second example of an output signal of the liquid surface sensor 45. FIG. 9 is a graph for explaining movement distance of the dispensing probe 21a. FIG. 10 is a graph for explaining immersion distance of the dispensing probe 21a.

As illustrated in FIG. 7, the dispensing probe 21a including the inner pipe 107 and the outer pipe 108 lowers from a lowering start position h to a lowering stop position j, and sucks the specimen. Then, while lowering from the lowering start position h to the lowering stop position j, the end of the inner pipe 107 contacts the liquid surface. As illustrated in FIG. 8, when the end of the inner pipe 107 contacts the liquid surface, a detection potential by the liquid surface sensor 45 becomes high. Thus, time taken from the lowering start position h until reaching a liquid surface detection position i, which is the position of the liquid surface, is detected (hereinafter the "liquid surface detection time").

In the second determination method for excessive immersion, an immersion distance of the dispensing probe 21a is calculated on the basis of the time required from the lowering start position h to the lowering stop position j and the liquid surface detection time. The horizontal axis of the graph illustrated in FIG. 9 is time, and the vertical axis is speed of the lowering operation of the dispensing probe 21a. Accordingly, an area enclosed by the graph, the x axis (time), and the y axis (speed) illustrated in FIG. 9 is the movement distance of the dispensing probe 21a (distance from the lowering start position h to the lowering stop position j).

In FIG. 10, the liquid surface detection time is substituted into the graph illustrated in FIG. 9. Thus, an area on and after the liquid surface detection time (hatched area of FIG. 10) is the movement distance of the dispensing probe 21a on and after the liquid surface detection position i. That is, the excessive immersion determination portion 44c calculates the area on and after the liquid surface detection time so as to be able to calculate the immersion distance of the dispensing probe 21a.

Then, the excessive immersion determination portion 44c compares the calculated immersion distance of the dispensing probe 21a with the predetermined distance b, which is a cleanable region, (see FIG. 5), and determines that immersion is normal (not excessive immersion) when the immersion distance of the dispensing probe 21a is equal to or less than the predetermined distance b. Meanwhile, when the immersion distance of the dispensing probe 21a is greater than the predetermined distance b, the excessive immersion determination portion 44c determines that immersion is excessive immersion. Thus, in the second determination method for excessive immersion, the immersion distance of the dispensing probe 21a is calculated. Therefore, undetectable region for which excessive immersion cannot be detected is not generated.

1-3. Alarm Output

Next, alarm output is described.

FIG. 11 is a view illustrating an example of the display portion outputting alarm history.

As illustrated in FIG. 11, in the present embodiment, an alarm is output to the display portion 41 when various errors are detected or a matter to be reported to the operator is generated. Items of the alarm of the present embodiment include date and time of occurrence, alarm No., and content. The alarms are displayed and listed in order of output such that the history of a predetermined number of alarms can be confirmed.

The box of date and time of occurrence displays year, month, day, and time. Moreover, the box of content displays the content of an alarm. Alarm No. is assigned to each content to be reported. For example, when the dispensing probe 21a is excessively immersed, alarm No. 13199 is displayed. Thus, the operator can confirm that the dispensing probe 21a is excessively immersed and the date and time of occurrence of excessive immersion.

1-4. Setting in the Case of Excessive Immersion

Next, setting in the case of excessive immersion is described.

FIG. 12 is a view illustrating an example of a control setting screen in the case of excessive immersion of the dispensing probe 21a.

In the present embodiment, an immersion upper limit value of the dispensing probe 21a and an operation executed when excessive immersion of the dispensing probe 21a occurs can be preset on the control setting screen.

The control setting screen illustrated in FIG. 12 is displayed on the display portion 41 prior to start of analysis by the measurement portion 1a. The operator uses the input portion 42 to set an immersion upper limit value of the dispensing probe 21a and an operation executed when excessive immersion of the dispensing probe 21a occurs.

The immersion upper limit value displays "b" which is the aforementioned cleanable region as an initial value. The operator can change the immersion upper limit value depending on the specimen (sample) or measurement content. When the immersion upper limit value is not changed, the initial value "b" is the immersion upper limit value. Note that the immersion upper limit value may be input with use of up and down arrow buttons displayed on the setting screen, or a numerical value may be input directly.

In the present embodiment, the operation executed when excessive immersion of the dispensing probe 21a occurs includes "shift to stop mode," "shift to partial stop mode," and "maintain measurement mode." The operator selects one of "shift to stop mode," "shift to partial stop mode," and "maintain measurement mode." Thus, the operation executed when excessive immersion of the dispensing probe 21a occurs is set. Note that "maintain measurement mode" in which the dispensing operation of the dispensing probe 21a is practically continued is an example of the continuation mode of the present invention.

The measurement mode is a state in which a preparation operation for measurement of the specimen has been completed and measurement of the specimen can be received. Here, reception indicates that barcode information (including information of specimen ID) of a specimen container is read with the barcode reader set on the sample turntable 2 or the specimen feed apparatus 100, measurement instructions are referenced on the basis of the read barcode information, and the measurement instructions are input to the input/output control portion 44. When the specimen is conveyed from the specimen feed apparatus 100 in cases where the measurement portion 1a is in the measurement mode, a predetermined dispensing operation is executed according to the measurement instructions. When the predetermined dispensing operation is completed, the specimen is conveyed to a predetermined position (storage position) away from the dispensing position.

The stop mode is a state in which the measurement of the specimen cannot be received. In the case of shifting from the measurement mode to the stop mode, the reception of measurement of a subsequent specimen and the dispensing operation are stopped, and measurement instructions with respect to the specimen for which the reception has been completed and a predetermined dispensing operation according to the measurement instructions has not been performed are stopped. Then, after completion of the measurement of the specimen for which the reception has previously been completed and a predetermined dispensing operation according to measurement instructions has been completed, each operation portion of the measurement portion 1a moves to and stops at a predetermined position (standby position), and shifting to the stop mode is completed. Moreover, the specimen conveyed to the dispensing position during shifting to the stop mode passes the dispensing position and is conveyed to a predetermined position (storage position).

The partial stop mode is a state in which the operator needs to access the specimen container P2 or the reagent containers P4 and P5 to set or remove the specimen or the reagent, and the related operation portion (at least one or more of the specimen dispensing unit 21a, sample turntable 2, the first reagent turntable 4, and the second reagent turntable 5) is temporarily stopped. The partial stop mode is maintained until the operator's instruction of restarting the measurement is given.

In the case of shifting from the measurement mode to the partial stop mode, the reception of measurement of a subsequent specimen and the dispensing operation are temporarily stopped. Note that the specimen conveyed to the dispensing position during shifting to the partial stop mode is maintained in a state of being arranged in the dispensing position. Thus, the measurement portion 1a can restart a predetermined dispensing operation and the measurement of the specimen at any time.

1-5. Dispensing Processing

Next, a procedure of the dispensing processing of the automatic analysis apparatus 1 performed under control by the input/output control portion 44 (see FIG. 2) is described with reference to the flowcharts illustrated in FIGS. 13 to 17.

FIGS. 13 to 17 are a flowchart illustrating an example of the dispensing processing according to the first embodiment.

First, the operator sets an immersion upper limit value of the dispensing probe 21a and an operation executed when excessive immersion of the dispensing probe 21a occurs on the control setting screen in the case of excessive immersion (see FIG. 12), and then gives an instruction of analysis start.

The input/output control portion 44, when an analysis start instruction (S1) is given, determines whether a current mode is the stop mode (S2).

When it is determined that the current mode is the stop mode in S2 (YES in S2), the input/output control portion 44 moves each unit to the initial position (S3). Then, each unit is cleaned (S4). After processing of S4 or when it is determined that the current mode is not the stop mode in S2 (NO in S2), the input/output control portion 44 shifts to the measurement mode (S5).

Next, the input/output control portion 44 determines whether there is a specimen for which the reception of the measurement of specimen has been completed (received specimen) and a predetermined dispensing operation according to the measurement instructions has not been completed (non-dispensed specimen) (S6). When it is determined that there is no non-dispensed specimen in the received specimens in S6 (NO in S6), the input/output control portion 44 ends the dispensing processing. Meanwhile, when it is determined that there is a non-dispensed specimen in the received specimens in S6 (YES in S6), the input/output control portion 44 moves the dispensing probe 21a to the specimen container P2 and sucks the specimen with the dispensing probe 21a (S7).

Next, the input/output control portion 44 (excessive immersion determination portion 44c) determines whether the dispensing probe 21a has been immersed over the preset immersion upper limit (excessively immersed) (S8). When it is determined that the dispensing probe 21a is not immersed over the immersion upper limit in S8 (NO in S8), the input/output control portion 44 moves the dispensing probe 21a to the dilution container P3 and discharges the specimen of the dispensing probe 21a to the dilution container P3 (S9).

Next, the input/output control portion 44 moves the dispensing probe 21a to the cleaning position (cleaning bath) of the probe cleaning apparatus 30, and cleans the dispensing probe 21a (S10). When the processing of S10 ends, the input/output control portion 44 returns the processing to S6 and repeats the processing from S6.

Meanwhile, when it is determined that the dispensing probe 21a is immersed over the immersion upper limit (excessively immersed) in S8 (YES in S8), the input/output control portion 44 outputs an alarm to the display portion 41 (S11). Then, the input/output control portion 44 moves the dispensing probe 21a to above the specimen container P2 (S12).

Next, the input/output control portion 44 determines whether the "maintain measurement mode" is set in the control setting in the case of excessive immersion of the dispensing probe 21a (S13). When it is determined that "maintain measurement mode" is not set in S13 (NO in S13), the input/output control portion 44 determines whether "stop probe immediately" is set (S14). Note that setting of "stop probe immediately" may be made in the control setting in the case of excessive immersion or may be made separately from the control setting in the case of excessive immersion. Moreover, when "stop probe immediately" is set, in order to prevent dripping of the specimen form the specimen dispensing probe 21a, the specimen dispensing probe 21a is not moved to the dilution container P3 of the dilution turntable 3, but temporarily stopped above the specimen collection position.

When it is determined that "stop probe immediately" is not set in S14 (NO in S14) or when it is determined that "maintain measurement mode" is set in S13 (YES in S13), the input/output control portion 44 moves the dispensing probe 21a to the dilution container P3 and discharges the specimen of the dispensing probe 21*a* to the dilution container P3 (S15). Next, the input/output control portion 44 moves the dispensing probe 21*a* to the cleaning position (cleaning bath) of the probe cleaning apparatus 30 and cleans the dispensing probe 21*a* (S16).

After the processing of S16 or when it is determined that "stop probe immediately" is set in S14 (YES in S14), the input/output control portion 44 checks the control setting in the case of excessive immersion of the dispensing probe 21*a* (S17) and performs the set control (operation). When it is determined that "maintain measurement mode" is set by the control setting in the case of excessive immersion of the dispensing probe 21*a* in S17, the input/output control portion 44 shifts to the processing of S6.

When it is determined that "shift to stop mode" is set by the control setting in the case of excessive immersion of the dispensing probe 21*a* in S17, the input/output control portion 44 determines whether the measurement of the dispensed specimen has ended (S18).

When it is determined that the measurement of the dispensed specimen has not ended in S18 (NO in S18), the input/output control portion 44 repeats the processing of S18 until the measurement of the dispensed specimen ends. That is, the input/output control portion 44 waits until the measurement of the dispensed specimen ends. Then, when it is determined that the measurement of the dispensed specimen has ended in S18 (YES in S18), the input/output control portion 44 shifts to the stop mode (S19).

When it is determined that "shift to partial stop mode" is set by the control setting in the case of excessive immersion of the dispensing probe 21*a* in S17, the input/output control portion 44 shifts to the partial stop mode (S20).

After the processing of S19 or S20, the input/output control portion 44 displays a response selection screen on the display portion 41 (S21). The response selection screen displays "shift to measurement mode," "perform special cleaning," and "clean manually." The operator selects any one of the three displayed responses.

Next, the input/output control portion 44 checks the response selected in the processing of S21 (S22) and performs the selected response. When it is determined that the response selected on the response selection screen is "perform special cleaning" in S22, the input/output control portion 44 determines whether excitation of the dispensing probe 21*a* is on (S23).

When it is determined that the excitation of the dispensing probe 21*a* is not on in S23 (NO in S23), the input/output control portion 44 turns on the excitation of the dispensing probe 21*a* (S24). After the processing of S24 or when it is determined that the excitation of the dispensing probe 21*a* is on in S23 (YES in S23), the input/output control portion 44 determines whether the dispensing probe 21*a* is in the cleaning position (cleaning bath) of the probe cleaning apparatus 30 (S25).

When it is determined that the dispensing probe 21*a* is not in the cleaning position in S25 (NO in S25), the input/output control portion 44 moves the dispensing probe 21*a* to the cleaning position (S26). After the processing of S26 or when it is determined that the dispensing probe 21*a* is in the cleaning position in S25 (YES in S25), the input/output control portion 44 performs special cleaning on the dispensing probe 21*a* (S27).

The special cleaning, unlike typical cleaning in terms of cleaning time, cleaning range, cleaning liquid, and cleaning process, carefully cleans a wider range as compared with the typical cleaning. Accordingly, the special cleaning can also clean a portion contaminated by excessive immersion of the dispensing probe 21*a*.

Next, the input/output control portion 44 determines whether the outer wall of the dispensing probe 21*a* is contaminated (S28). In the processing of S28, a contamination determination portion, which is not illustrated, determines whether the outer wall of the dispensing probe 21*a* is contaminated. The contamination determination portion determines whether the outer wall of the dispensing probe 21*a* is contaminated on the basis of an image of the dispensing probe 21*a* output from an imaging portion, which is not illustrated.

When it is determined that the outer wall of the dispensing probe 21*a* is not contaminated in S28 (NO in S28), the input/output control portion 44 shifts to the processing of S21. Note that, in the case of NO in S28, the outer wall of the dispensing probe 21*a* is not contaminated. Therefore, the input/output control portion 44 may shift to the processing of S2 (see FIG. 13).

Meanwhile, when it is determined that the outer wall of the dispensing probe 21*a* is contaminated in S28 (YES in S28), the input/output control portion 44 determines whether the number of times of contamination determination retry has reached the preset number of times (S29).

When it is determined that the number of times of contamination determination retry has not reached the preset number of times in S29 (NO in S29), the input/output control portion 44 shifts to the processing of S27. Meanwhile, when it is determined that the number of times of contamination determination retry has reached the preset number of times in S29 (YES in S29), the input/output control portion 44 shifts to the processing of S21.

When it is determined that the response selected on the response selection screen is "clean manually" in S22, the input/output control portion 44 determines whether "stop probe immediately" is set (S30).

When it is determined that "stop probe immediately" is set in S30 (YES in S30), the input/output control portion 44 turns off the excitation of the dispensing probe 21*a* (S31). Thus, when "stop probe immediately" is set, the dispensing probe 21*a* is not moved. Therefore, the specimen attached to the outer wall of the dispensing probe 21*a* is prevented from being discharged to other containers, e.g., the dilution container P3, or other units. Moreover, when the excitation of the dispensing probe 21*a* is turned off, safety of the operator who touches the dispensing probe 21*a* during cleaning can be protected.

After the processing of S31, the operator moves the dispensing probe 21*a* to the cleanable position while preventing dripping of the specimen, and cleans the outer wall of the dispensing probe 21*a* manually. Moreover, after the processing of S31, the input/output control portion 44 shifts to the processing of S21.

Meanwhile, when it is determined that "stop probe immediately" is not set in S30 (NO in S30), the input/output control portion 44 determines whether the excitation of the dispensing probe 21*a* is on (S32).

When it is determined that the excitation of the dispensing probe 21*a* is not on in S32 (NO in S32), the input/output control portion 44 turns on the excitation of the dispensing probe 21*a* (S33). After the processing of S33 or when it is determined that the excitation of the dispensing probe 21*a* is on in S32 (YES in S32), the input/output control portion 44 moves the dispensing probe 21*a* to the cleanable position and turns off the excitation of the dispensing probe 21*a* (S34).

When the dispensing probe 21a is arranged in the cleanable position, the operator cleans the dispensing probe 21a manually. Moreover, after the processing of S34, the input/output control portion 44 shifts to the processing of S21.

When it is determined that the response selected on the response selection screen is "shift to measurement mode" in S22, the input/output control portion 44 determines whether the excitation of the dispensing probe 21a is on (S35).

When it is determined that the excitation of the dispensing probe 21a is not on in S35 (NO in S35), the input/output control portion 44 turns on the excitation of the dispensing probe 21a (S36). After the processing of S36 or when it is determined that the excitation of the dispensing probe 21a is on in S35 (YES in S35), the input/output control portion 44 determines whether the dispensing probe 21a is in the initial position (S37).

When it is determined that the dispensing probe 21a is not in the initial position in S37 (NO in S37), the input/output control portion 44 moves the dispensing probe 21a to the initial position (S38). After the processing of S38, the input/output control portion 44 shifts to the processing of S2 (see FIG. 13).

In S16 of the aforementioned dispensing processing (see FIG. 14), normal cleaning of the dispensing probe 21a is performed. However, in the processing of S16, the special cleaning may be performed. Here, a description is given of the case of the special cleaning in the processing of S16.

Figure 18:
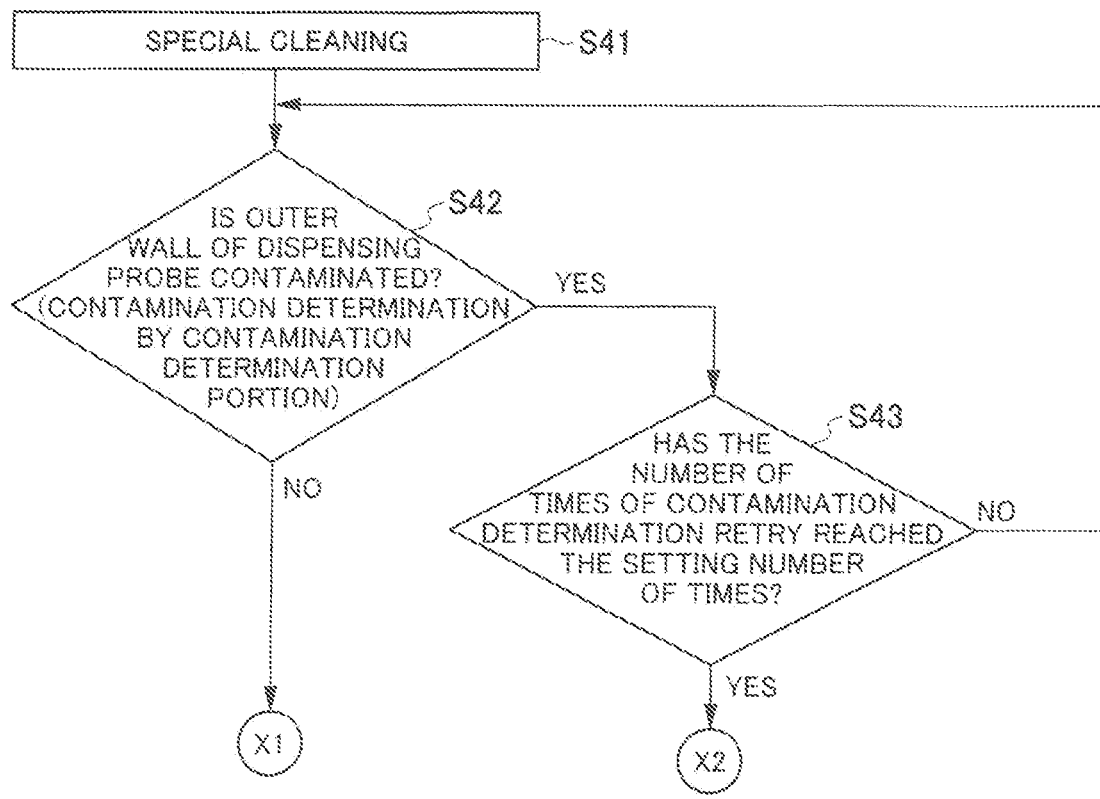
FIG. 18 is a flowchart illustrating an example of processing in which special cleaning is performed in S16 of the dispensing processing according to the first embodiment of the present invention.
Figure 19:
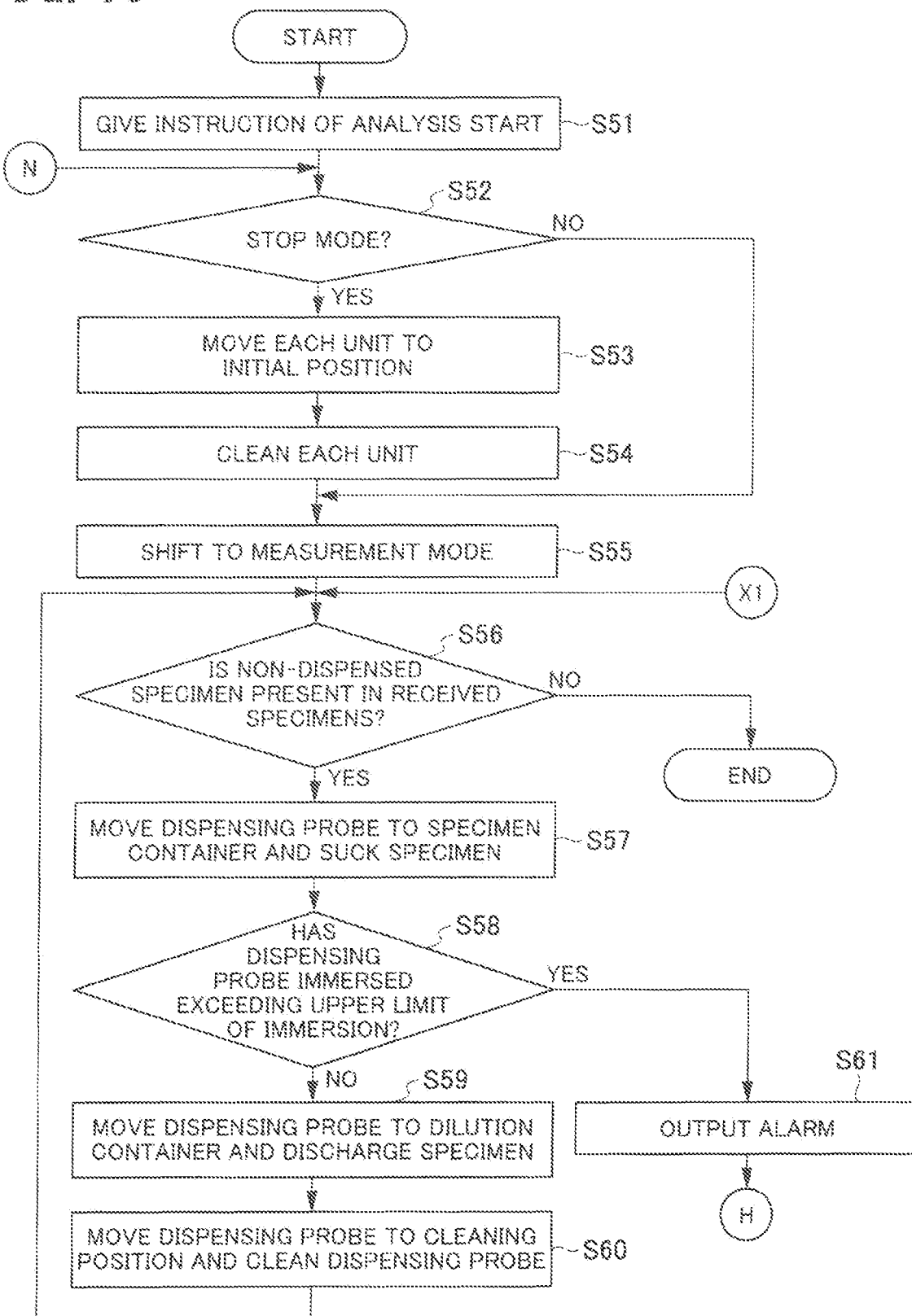
FIG. 19 is a flowchart illustrating an example of dispensing processing according to a second embodiment of the present invention.
Figure 20:
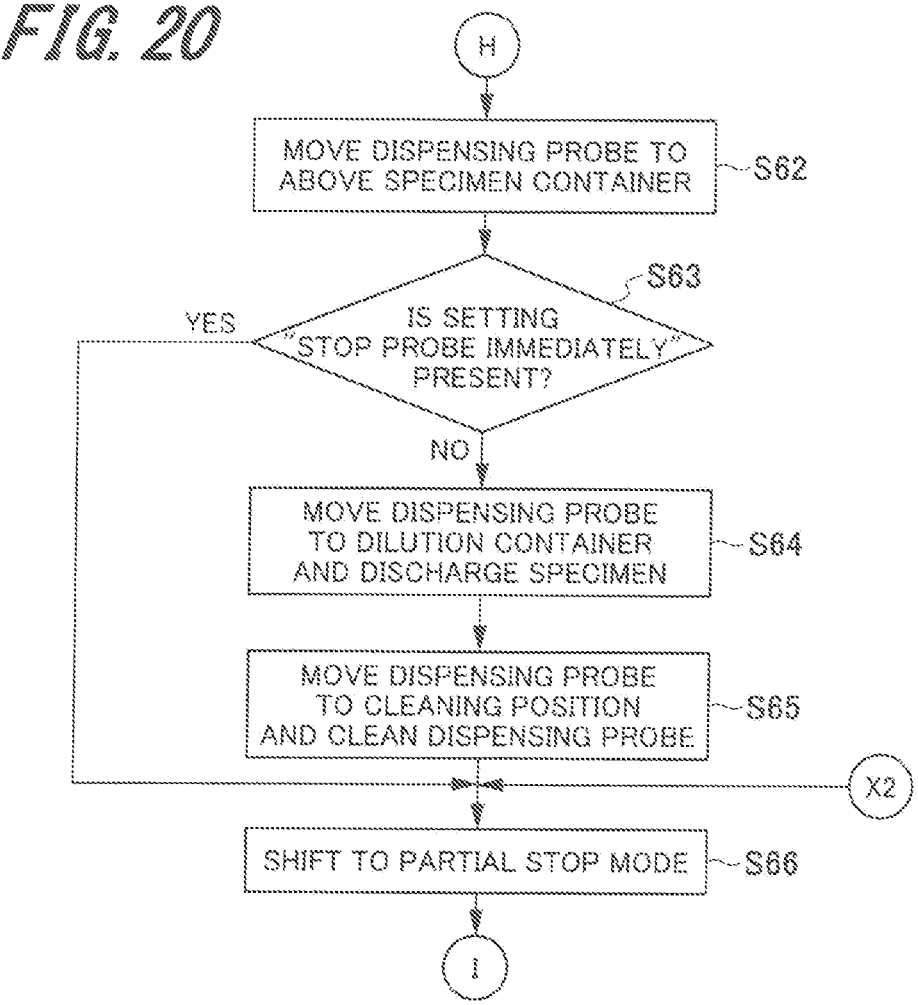
FIG. 20 is a flowchart illustrating an example of dispensing processing according to the second embodiment of the present invention.
Figure 21:
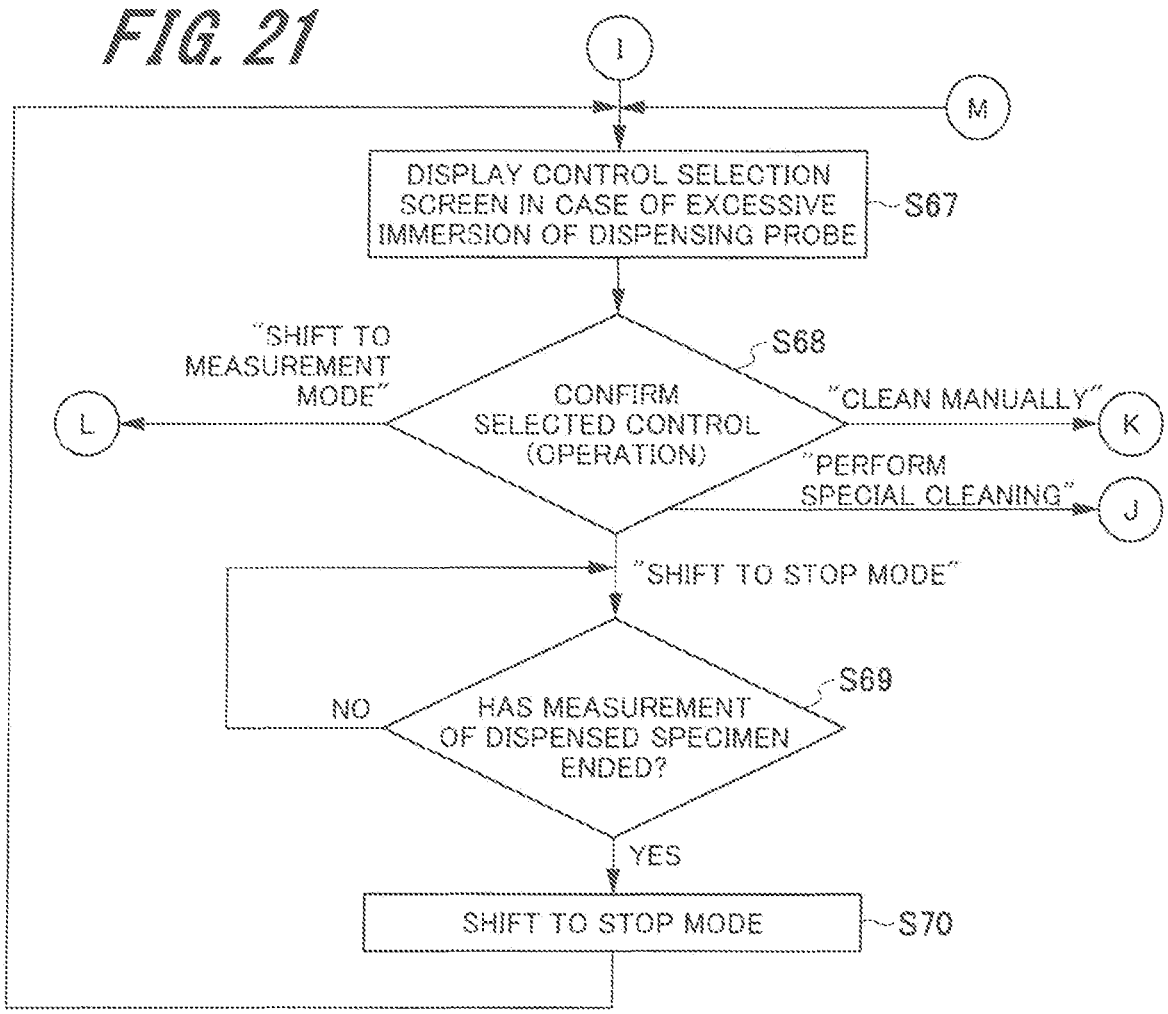
FIG. 21 is a flowchart illustrating an example of dispensing processing according to the second embodiment of the present invention.
Figure 22:
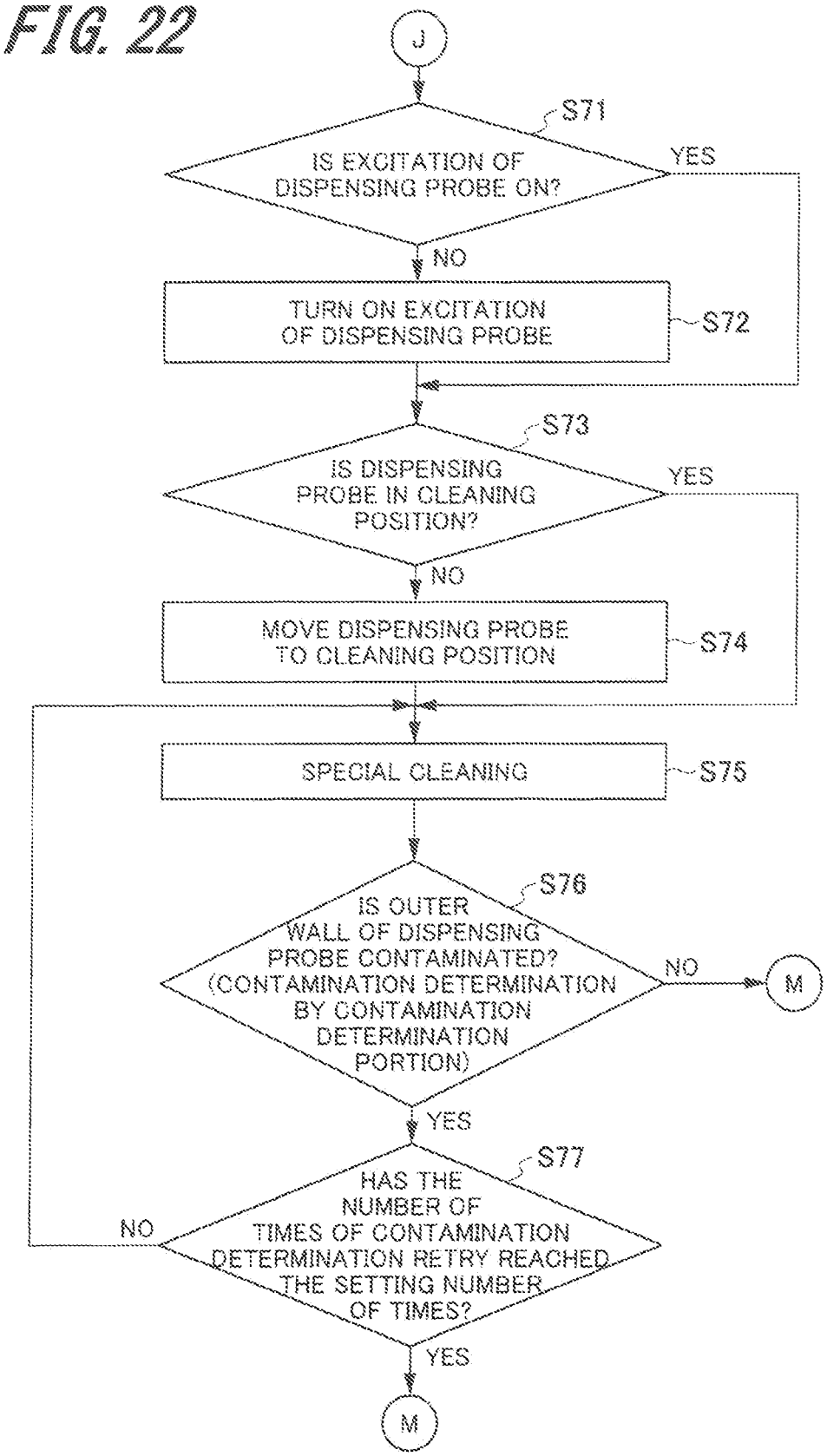
FIG. 22 is a flowchart illustrating an example of dispensing processing according to the second embodiment of the present invention.
Figure 23:
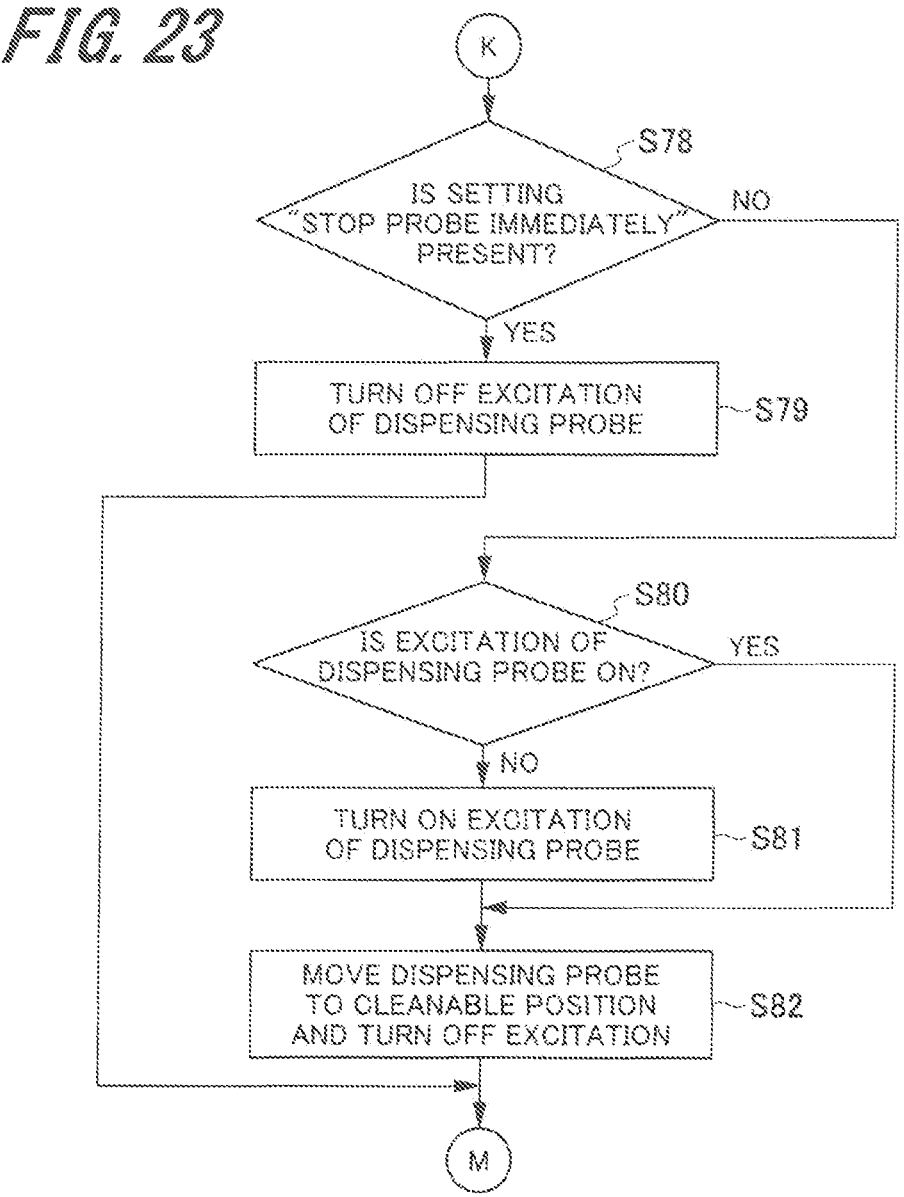
FIG. 23 is a flowchart illustrating an example of dispensing processing according to the second embodiment of the present invention.
Figure 24:
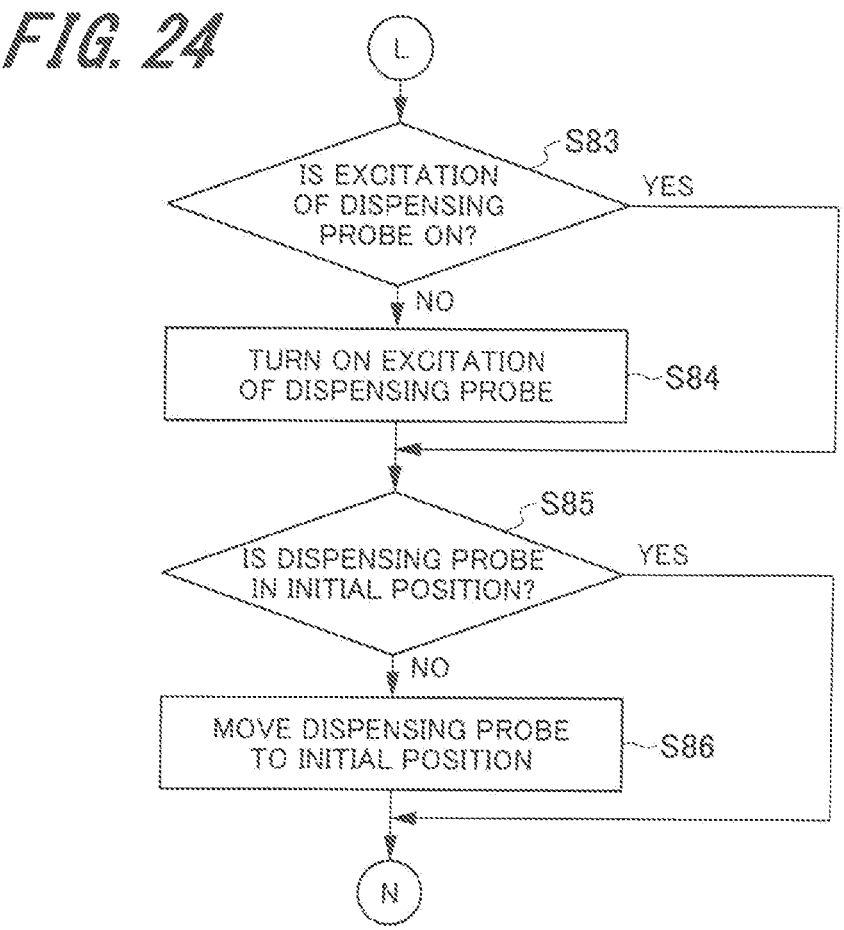
FIG. 24 is a flowchart illustrating an example of dispensing processing according to the second embodiment of the present invention.

FIG. 18 is a flowchart illustrating an example of processing in which the special cleaning is performed in S16 in the dispensing processing according to the first embodiment.

First, the input/output control portion 44 performs the special cleaning of the dispensing probe 21a (S41). Next, the input/output control portion 44 determines whether the outer wall of the dispensing probe 21a is contaminated (S42). When it is determined that the outer wall of the dispensing probe 21a is not contaminated in S42 (NO in S42), the input/output control portion 44 shifts to the processing of S6 (see FIG. 13).

Meanwhile, when it is determined that the outer wall of the dispensing probe 21a is contaminated in S42 (YES in S42), the input/output control portion 44 determines whether the number of times of contamination determination retry has reached the preset number of times (S43).

When it is determined that the number of times of contamination determination retry has not reached the preset number of times in S43 (NO in S43), the input/output control portion 44 shifts to the processing of S42. Meanwhile, when it is determined that the number of times of contamination determination retry has reached the preset number of times in S43 (YES in S43), the input/output control portion 44 shifts to the processing of S17 (see FIG. 14).

As described above, in the dispensing processing of the present embodiment, control executed in the case of excessive immersion of the dispensing probe 21a can be selected from a plurality of controls (e.g., "maintain measurement mode," "shift to stop mode," "shift to partial stop mode," and "stop probe immediately"). Thus, when the dispensing probe 21a is excessively immersed, an operation depending on use can be performed.

For example, in the case of use in which the specimen (sample) measured by the automatic analysis apparatus 1 of the present embodiment is also used for measurement with a different analysis apparatus, "shift to stop mode" is set as control executed in the case of excessive immersion. Thus, the specimen of the sample turntable 2 or the specimen feed apparatus 100 can be retrieved immediately, and it is possible to perform measurement with the different analysis apparatus in advance.

Moreover, in the case of use in which the specimen (sample) measured by the automatic analysis apparatus 1 of the present embodiment is not used for measurement with a different analysis apparatus, "shift to partial stop mode" is set as control executed in the case of excessive immersion. Thus, the state of the specimen (sample) and the dispensing probe 21a can be confirmed in a short period of time, and measurement can be restarted in a short period of time.

Moreover, in the case of use in which the specimen (sample) measured by the automatic analysis apparatus 1 of the present embodiment is not used for measurement with a different analysis apparatus and a time required for restart of the measurement is allowed to some extent, "stop probe immediately" is set as control executed in the case of excessive immersion. Thus, when the dispensing probe 21a is excessively immersed, it is possible to prevent dripping or the like of the specimen (sample).

Moreover, in the case of use in which the specimen (sample) for which excessive immersion of the dispensing probe 21a is allowed to some extent is measured, "maintain measurement mode" is set as control executed in the case of excessive immersion. Thus, even when the dispensing probe 21a is excessively immersed, it is possible to continue the measurement operation without stop.

Moreover, in the dispensing processing of the present embodiment, it is determined whether the outer wall of the dispensing probe 21a is contaminated. Then, when it is determined that the outer wall of the dispensing probe 21a is not contaminated, the measurement operation is restarted. Thus, it is not necessary for the operator to confirm whether the dispensing probe 21a is contaminated, enabling a reduction in burden on the operator.

2. Second Embodiment

Next, an automatic analysis apparatus of the second embodiment is described. The automatic analysis apparatus of the second embodiment has the same configuration as the automatic analysis apparatus 1 of the first embodiment, but they are different in terms of the dispensing processing. Therefore, here, the dispensing processing of the second embodiment is described, and the same configuration as the configuration of the automatic analysis apparatus 1 of the first embodiment will not be elaborated.

FIGS. 19 to 24 are a flowchart illustrating an example of the dispensing processing according to the second embodiment.

First, the operator sets an immersion upper limit value of the dispensing probe 21a on the control setting screen in the case of excessive immersion (see FIG. 12) and gives an instruction of analysis start. The input/output control portion 44, when an analysis start instruction (S51) is given, determines whether a current mode is the stop mode (S52).

When it is determined that the current mode is the stop mode in S52 (YES in S52), the input/output control portion 44 moves each unit to the initial position (S53). Then, each unit is cleaned (S54). After the processing of S54 or when it is determined that the current mode is not the stop mode in S52 (NO in S52), the input/output control portion 44 shifts to the measurement mode (S55).

Next, the input/output control portion 44 determines whether there is a non-dispensed specimen in the received specimens (S56). When it is determined that there is no non-dispensed specimen in the received specimens in S56

(NO in S56), the input/output control portion 44 ends the dispensing processing. Meanwhile, when it is determined that there is a non-dispensed specimen in the received specimens in S56 (YES in S56), the input/output control portion 44 moves the dispensing probe 21a to the specimen container P2 and sucks the specimen with the dispensing probe 21a (S57).

Next, the input/output control portion 44 (excessive immersion determination portion 44c) determines whether the dispensing probe 21a has been immersed over the preset immersion upper limit (excessively immersed) (S58). When it is determined that the dispensing probe 21a is not immersed over the immersion upper limit in S58 (NO in S58), the input/output control portion 44 moves the dispensing probe 21a to the dilution container P3 and discharges the specimen of the dispensing probe 21a to the dilution container P3 (S59).

Next, the input/output control portion 44 moves the dispensing probe 21a to the cleaning position (cleaning bath) of the probe cleaning apparatus 30, and cleans the dispensing probe 21a (S60). When the processing of S60 ends, the input/output control portion 44 returns the processing to S56 and repeats the processing from S56.

Meanwhile, when it is determined that the dispensing probe 21a is immersed over the immersion upper limit (excessively immersed) in S58 (YES in S58), the input/output control portion 44 outputs an alarm to the display portion 41 (S61). Then, the input/output control portion 44 moves the dispensing probe 21a to above the specimen container P2 (S62).

Next, the input/output control portion 44 determines whether the "stop probe immediately" is set (S63). When it is determined that "stop probe immediately" is not set in S63 (NO in S63), the input/output control portion 44 moves the dispensing probe 21a to the dilution container P3 and discharges the specimen of the dispensing probe 21a to the dilution container P3 (S64).

Next, the input/output control portion 44 moves the dispensing probe 21a to the cleaning position (cleaning bath) of the probe cleaning apparatus 30 and cleans the dispensing probe 21a (S65). After the processing of S65 or when it is determined that "stop probe immediately" is set in S63 (YES in S63), the input/output control portion 44 shifts to the partial stop mode (S66).

Next, the input/output control portion 44 displays the control setting screen in the case of excessive immersion of the dispensing probe 21a on the display portion (S67). The control setting screen in the case of excessive immersion of the dispensing probe 21a displays "shift to stop mode," "shift to measurement mode," "perform special cleaning," and "clean manually." The operator selects any of the four displayed control (operations).

Next, the input/output control portion 44 confirms the control (operation) selected in the processing of S67 (S68), and performs the selected control (operation). When it is determined that the control (operation) selected on the control setting screen is "shift to stop mode" in S68, the input/output control portion 44 determines whether the measurement of the dispensed specimen has ended (S69).

When it is determined that the measurement of the dispensed specimen has not ended in S69 (NO in S69), the input/output control portion 44 repeats the processing of S69 until the measurement of the dispensed specimen ends. That is, the input/output control portion 44 waits until the measurement of the dispensed specimen ends. Then, when it is determined that the measurement of the dispensed specimen has ended in S69 (YES in S69), the input/output control portion 44 shifts to the stop mode (S70). After the processing of S70, the input/output control portion 44 shifts to the processing of S67.

When it is determined that the control (operation) selected on the control setting screen is "perform special cleaning" in S68, the input/output control portion 44 determines whether the excitation of the dispensing probe 21a is on (S71).

When it is determined that the excitation of the dispensing probe 21a is not on in S71 (NO in S71), the input/output control portion 44 turns on the excitation of the dispensing probe 21a (S72). After the processing of S72 or when it is determined that the excitation of the dispensing probe 21a is on in S71 (YES in S71), the input/output control portion 44 determines whether the dispensing probe 21a is in the cleaning position (cleaning bath) of the probe cleaning apparatus 30 (S73).

When it is determined that the dispensing probe 21a is not in the cleaning position in S73 (NO in S73), the input/output control portion 44 moves the dispensing probe 21a to the cleaning position (S74). After the processing of S74 or when it is determined that the dispensing probe 21a is in the cleaning position in S73 (YES in S73), the input/output control portion 44 performs the special cleaning on the dispensing probe 21a (S75).

Next, the input/output control portion 44 determines whether the outer wall of the dispensing probe 21a is contaminated (S76). When it is determined that the outer wall of the dispensing probe 21a is not contaminated in S76 (NO in S76), the input/output control portion 44 shifts to the processing of S67 (see FIG. 21). Note that, in the case of NO in S76, the outer wall of the dispensing probe 21a is not contaminated. Therefore, the input/output control portion 44 may shift to the processing of S52 (see FIG. 19).

Meanwhile, when it is determined that the outer wall of the dispensing probe 21a is contaminated in S76 (YES in S76), the input/output control portion 44 determines whether the number of times of contamination determination retry has reached the preset number of times (S77).

When it is determined that the number of times of contamination determination retry has not reached the preset number of times in S77 (NO in S77), the input/output control portion 44 shifts to the processing of S75. Meanwhile, when it is determined that the number of times of contamination determination retry has reached the preset number of times in S77 (YES in S77), the input/output control portion 44 shifts to the processing of S67.

When it is determined that the control (operation) selected on the control setting screen is "clean manually" in S68 (see FIG. 21), the input/output control portion 44 determines whether "stop probe immediately" is set (S78).

When it is determined that "stop probe immediately" is set (YES in S78) in S78, the input/output control portion 44 turns off the excitation of the dispensing probe 21a (S79). Thus, when "stop probe immediately" is set, the dispensing probe 21a is not moved. Therefore, the specimen attached to the outer wall of the dispensing probe 21a is prevented from being discharged to other containers, e.g., the dilution container P3, or other units. After the processing of S79, the input/output control portion 44 shifts to the processing of S67 (see FIG. 21).

After the processing of S79, the operator moves the dispensing probe 21a to the cleanable position while preventing dripping of the specimen, and cleans the outer wall of the dispensing probe 21a manually. Moreover, after the processing of S79, the input/output control portion 44 shifts to the processing of S67 (see FIG. 21).

Meanwhile, when it is determined that "stop probe immediately" is not set in S78 (NO in S78), the input/output control portion 44 determines whether the excitation of the dispensing probe 21a is on (S80).

When it is determined that the excitation of the dispensing probe 21a is not on in S80 (NO in S80), the input/output control portion 44 turns on the excitation of the dispensing probe 21a (S81). After the processing of S81 or when it is determined that the excitation of the dispensing probe 21a is on in S80 (YES in S80), the input/output control portion 44 moves the dispensing probe 21a to the cleanable position and turns off the excitation of the dispensing probe 21a (S82).

When the dispensing probe 21a is arranged in the cleanable position, the operator cleans the dispensing probe 21a manually. Moreover, after the processing of S82, the input/output control portion 44 shifts to the processing of S67.

When it is determined that the control (operation) selected on the control setting screen is "shift to measurement mode" in S68 (see FIG. 21), the input/output control portion 44 determines whether the excitation of the dispensing probe 21a is on (S83).

When it is determined that the excitation of the dispensing probe 21a is not on in S83 (NO in S83), the input/output control portion 44 turns on the excitation of the dispensing probe 21a (S84). After the processing of S84 or when it is determined that the excitation of the dispensing probe 21a is on in S83 (YES in S83), the input/output control portion 44 determines whether the dispensing probe 21a is in the initial position (S85).

In S85, when it is determined that the dispensing probe 21a is not in the initial position (NO in S85), the input/output control portion 44 moves the dispensing probe 21a to the initial position (S86). After the processing of S86, the input/output control portion 44 shifts to the processing S52 (see FIG. 19).

As described above, in the dispensing processing of the present embodiment, similar to the first embodiment, control executed in the case of excessive immersion of the dispensing probe 21a can be selected from a plurality of controls (e.g., "maintain measurement mode," "shift to stop mode," "shift to partial stop mode," and "stop probe immediately"). Thus, when the dispensing probe 21a is excessively immersed, an operation depending on use can be performed.

Moreover, control subsequently executed after the dispensing probe 21a is excessively immersed can be selected. Therefore, even when the use is changed, an optimal operation corresponding to such change can be executed.

3. Third Embodiment

Next, an automatic analysis apparatus of the third embodiment is described. The automatic analysis apparatus of the third embodiment has the same configuration as the automatic analysis apparatus 1 of the first embodiment, but they are different in terms of the dispensing processing S17 (see FIG. 14). Therefore, here, the dispensing processing S17 of the third embodiment is described, and the same configuration and processing as the configuration and processing of the automatic analysis apparatus 1 of the first embodiment will not be elaborated.

After the processing of S16 or when it is determined that "stop probe immediately" is set in S14 (YES in S14), the input/output control portion 44 confirms the control setting depending on the immersion range (S17) and performs the set control (operation). When it is determined that "maintain measurement mode" is set in the control setting depending on the immersion range in S17, the input/output control portion 44 shifts to the processing of S6.

Meanwhile, when it is determined that "shift to stop mode" is set in the control setting depending on the immersion range in S17, the input/output control portion 44 shifts to the processing of S18. Moreover, when it is determined that "shift to partial stop mode" is set in the control setting depending on the immersion range in S17, the input/output control portion 44 shifts to the processing of S20.

FIG. 25 is a view illustrating an example of the control setting screen depending on the immersion range of the dispensing probe 21a.

As illustrated in FIG. 25, the automatic analysis apparatus of the third embodiment presets control depending on the immersion range (immersion distance). A first threshold is input to a first immersion distance input box 51, and a second threshold greater than the first threshold is input to a second immersion distance input box 52.

When the first threshold (e.g., "40") is input to the first immersion distance input box 51, a first immersion range (e.g., "less than 40 mm") is set. A pull-down button is provided next to the first immersion range such that control executed in the case of the first immersion range (e.g., "maintain measurement mode") can be selected from a pull-down list.

Moreover, when the first threshold is input to the first immersion distance input box 51, in conjunction with this input, a minimum value (e.g., "40") of a second immersion range is displayed. When the second threshold (e.g., "70") is input to the second immersion distance input box 52, a second immersion range (e.g., "40 mm or more and less than 70 mm") is set. A pull down button is provided next to the second immersion range such that control executed in the case of the second immersion range (e.g., "shift to partial stop mode") can be selected from a pull-down list.

Furthermore, when the second threshold is input to the second immersion distance input box 52, in conjunction with this input, a minimum value (e.g., "70") of a third immersion range is displayed, and the third immersion range (e.g., "70 mm or more") is set. A pull down button is provided next to the third immersion range such that control executed in the case of the third immersion range (e.g., "shift to stop mode") can be selected from a pull-down list.

In the present embodiment, a description is given of the example in which different controls are set with respect to the three immersion ranges. However, the same control may be set with respect to different immersion ranges in the automatic analysis apparatus of the present invention. Moreover, in the present embodiment, the three immersion ranges are set by the operator. However, a plurality of immersion ranges may be set in advance and the operator may select control corresponding to each immersion range in the automatic analysis apparatus of the present invention.

As described above, in the dispensing processing of the present embodiment, similar to the first embodiment, control executed in the case of excessive immersion of the dispensing probe 21a can be selected from a plurality of controls (e.g., "maintain measurement mode," "shift to stop mode," "shift to partial stop mode," and "stop probe immediately"). Thus, when the dispensing probe 21a is excessively immersed, an operation depending on use can be performed.

Moreover, a subsequent control may vary with the immersion range of the dispensing probe 21a. Therefore, it is possible to perform an operation depending on the state of immersion of the dispensing probe 21a. Thus, it is possible to more finely set an operation depending on the use.

The embodiments of the present invention are described above. However, the present invention is not limited to the aforementioned embodiments, but various modifications may be made without departing from the gist of the invention stated in the claims. For example, the aforementioned embodiments describe the present invention in detail for the sake of easy understanding, and the present invention is not necessarily limited to include all the configurations described. Moreover, a part of the configuration of an embodiment may be replaced with a configuration of another embodiment, and a configuration of another embodiment may be added to the configuration of an embodiment. Moreover, with respect to a part of the configuration of each embodiment, another configuration may be added, deleted or replaced.

Moreover, in the aforementioned first and second embodiments, before start of the dispensing processing, the immersion upper limit value (threshold) of the dispensing probe 21a is set. However, in the automatic analysis apparatus of the present invention, the immersion upper limit value may be automatically set by the excessive immersion determination method (presence or absence of undetectable region for which excessive immersion cannot be detected) or on the basis of the cleanable region of the dispensing probe 21a or the like.

Moreover, in the aforementioned first to third embodiments, a description is given of the dispensing probe 21a of the specimen dispensing unit 21 by way of example. However, the dispensing probe of the present invention is not limited to those dispensing a specimen (sample), but may be a dispensing probe of another dispensing unit, e.g., the first reagent dispensing unit 23.

Moreover, in the aforementioned first to third embodiments, a description is given of an example in which the present invention is applied to a biochemical analysis apparatus used for analysis of a biological sample, e.g., blood or urine as the automatic analysis apparatus. However, the present invention is not limited thereto, but may be applied to an apparatus that analyzes other various elements, e.g., water quality or food.

What is claimed is:

1. An automatic analysis apparatus comprising:
a display control portion configured to generate a display screen and output an alarm;
a measurement portion comprising:
a containment unit comprising a plurality of containers configured to contain a liquid;
a dispensing unit comprising a dispensing probe for dispensing the liquid; and
a gauging portion configured to gauge the liquid dispensed by the dispensing unit;
a probe cleaning unit configured to clean an outer wall of the dispensing probe of the dispensing unit;
a liquid surface sensor configured to output a signal depending on a contact state of the dispensing probe in the liquid;
an excessive immersion determination portion configured to determine whether an immersion range of the dispensing probe in the liquid exceeds a predetermined range based on the signal outputted from the liquid surface sensor, at a timing after the dispensing probe has arrived at a position to suck the liquid, wherein the predetermined range is a region that can be cleaned by the probe cleaning unit, wherein the probe cleaning unit is configured not to clean the dispensing probe outside of the predetermined range of the immersion range of the dispensing probe in the liquid, and wherein the excessive immersion determination portion provides instructions to the display control portion to output the alarm indicating that the immersion range of the dispensing probe in the liquid has exceeded the region that can be cleaned by the probe cleaning unit, when the immersion range of the dispensing probe in the liquid has exceeded the predetermined range;
a setting input portion configured to allow an operator to select and set an operation mode of a plurality of operation modes of the measurement portion to be performed in a case where the excessive immersion determination portion has determined that the immersion range of the dispensing probe in the liquid has exceeded the predetermined range, wherein the plurality of operation modes include: a continuation mode for continuing a dispensing operation with the dispensing probe in which the immersion range in the liquid has exceeded the predetermined range, a stop mode for stopping the measurement portion after gauging of the dispensed liquid ends, and a partial stop mode for stopping only an operation of the dispensing probe, wherein the stop mode is a state in which a measurement of a specimen cannot be received, and wherein the partial stop mode is a state which is maintained until an instruction to restart the measurement is received after cleaning of the dispensing probe in which the immersion range in the liquid has exceeded the predetermined range; and
a control portion configured to control the measurement portion depending on the operation mode set by the setting input portion.

2. The automatic analysis apparatus according to claim 1, wherein the excessive immersion determination portion calculates an immersion distance, which is a distance over which the dispensing probe is immersed in the liquid, on a basis of time when an end of the dispensing probe contacts a liquid surface of the liquid, time when the dispensing probe reaches a position of sucking the liquid, and speed of the dispensing probe, and determines that the immersion is the excessive immersion when the immersion distance exceeds a preset upper limit value.

3. The automatic analysis apparatus according to claim 2, wherein the setting input portion is capable of setting another operation mode of the plurality of operation modes that changes depending on the immersion distance.

* * * * *